US010220303B1

(12) United States Patent
Schmidt et al.

(10) Patent No.: US 10,220,303 B1
(45) Date of Patent: Mar. 5, 2019

(54) GESTURE-BASED MUSIC GAME

(71) Applicant: Harmonix Music Systems, Inc., Cambridge, MA (US)

(72) Inventors: Daniel A. Schmidt, Somerville, MA (US); Matthew C. Boch, Somerville, MA (US); Jason Deling Booth, Upton, MA (US); Brian Hodges Gibson, Providence, RI (US); James Gerard Toepel, Somerville, MA (US); Michael Mandel, Brookline, MA (US); Jonathan Mintz, Cambridge, MA (US); Mark Sullivan, Somerville, MA (US)

(73) Assignee: Harmonix Music Systems, Inc., Boston, MA (US)

( * ) Notice: Subject to any disclaimer, the term of this patent is extended or adjusted under 35 U.S.C. 154(b) by 1177 days.

(21) Appl. No.: 14/214,827

(22) Filed: Mar. 15, 2014

Related U.S. Application Data

(60) Provisional application No. 61/794,570, filed on Mar. 15, 2013.

(51) Int. Cl.
*A63F 13/00* (2014.01)
*A63F 13/219* (2014.01)
(Continued)

(52) U.S. Cl.
CPC .............. *A63F 13/04* (2013.01); *A63F 13/44* (2014.09); *A63F 13/814* (2014.09)

(58) Field of Classification Search
CPC ................ A63F 13/5375; A63F 13/814; A63F 2300/1087; A63F 2300/1093; G10H 1/368; G06F 3/005; G06F 3/0304; G06F 3/017
See application file for complete search history.

(56) References Cited

U.S. PATENT DOCUMENTS

D211,666 S 7/1968 MacGillavry
D245,038 S 7/1977 Ebata et al.
(Continued)

FOREIGN PATENT DOCUMENTS

EP 1029570 A2 8/2000
EP 000181482-0005 9/2004
(Continued)

OTHER PUBLICATIONS

Craymer, Loring, et al., "A Scalable, RTI-Compatible Interest Manager for Parallel Processors", in Proceedings of the 1997 Spring Simulation Interoperability Workshop, 97S-SIW-154, 1997, pp. 973-976 (4 pages).
(Continued)

*Primary Examiner* — Jay Liddle
*Assistant Examiner* — Alex F. R. P. Rada, II
(74) *Attorney, Agent, or Firm* — Wilmer Cutler Pickering Hale and Dorr LLP

(57) ABSTRACT

A method including displaying a multi-part visual cue that instructs a player to perform a gesture at a specified time, the multi-part visual cue including a first part indicating the gesture that is to be performed at the specified time, and a second part providing an indication of i) the specified time, and ii) a preparation period before the specified time, wherein the distance between the first and the second parts is variable over time, receiving, from a video camera, position information associated with positions of the player over time, determining a first displacement of the player using the position information, determining whether the first displacement of the player matches a first target displacement criterion associated with the multi-part visual cue, when the first displacement matches the first target displacement criterion within a timing window of the specified time, altering a gameplay characteristic of the video game.

18 Claims, 22 Drawing Sheets

202
204
206
208
210
202
204
206
208
210

(51) Int. Cl.
*A63F 13/814* (2014.01)
*A63F 13/44* (2014.01)

(56) References Cited

U.S. PATENT DOCUMENTS

D247,795 S 4/1978 Darrell
D259,785 S 7/1981 Kushida et al.
D262,017 S 11/1981 Frakes, Jr.
D265,821 S 8/1982 Okada et al.
D266,664 S 10/1982 Hoshino et al.
D287,521 S 12/1986 Obara
D310,668 S 9/1990 Takada
5,107,443 A 4/1992 Smith et al.
D345,554 S 3/1994 Dones
5,471,576 A 11/1995 Yee
5,537,528 A 7/1996 Takahashi et al.
5,588,096 A 12/1996 Sato et al.
5,689,618 A 11/1997 Gasper et al.
5,701,511 A 12/1997 Smith
5,711,715 A 1/1998 Ringo et al.
5,772,512 A 6/1998 Chichester
D398,916 S 9/1998 Bernardi
D400,196 S 10/1998 Cameron et al.
5,832,229 A 11/1998 Tomoda et al.
5,838,909 A 11/1998 Roy et al.
5,879,236 A 3/1999 Lambright
6,001,013 A 12/1999 Ota
6,077,162 A 6/2000 Weiss
6,126,548 A 10/2000 Jacobs et al.
6,137,487 A 10/2000 Mantha
6,191,773 B1 2/2001 Maruno et al.
6,206,782 B1 3/2001 Walker et al.
6,219,045 B1 4/2001 Leahy et al.
6,267,674 B1 7/2001 Kondo et al.
6,345,111 B1 2/2002 Yamaguchi et al.
6,347,994 B1 2/2002 Yoshikawa et al.
6,438,581 B1 8/2002 Neuhauser et al.
D462,698 S 9/2002 Sturm
6,542,168 B2 4/2003 Negishi et al.
6,554,706 B2 4/2003 Kim et al.
6,577,330 B1 6/2003 Tsuda et al.
6,597,861 B1 7/2003 Tozaki et al.
6,613,100 B2 9/2003 Miller
6,625,388 B2 9/2003 Winter et al.
6,636,238 B1 10/2003 Amir et al.
6,654,863 B2 11/2003 Nishio
6,663,491 B2 12/2003 Watabe et al.
6,697,079 B2 2/2004 Rose
6,710,785 B1 3/2004 Asai et al.
6,738,052 B1 5/2004 Manke et al.
6,765,590 B1 7/2004 Watahiki et al.
6,788,880 B1 9/2004 Fuchigami et al.
6,802,019 B1 10/2004 Lauder
D503,407 S 3/2005 Kaku
6,860,810 B2 3/2005 Cannon et al.
6,909,420 B1 6/2005 Nicolas et al.
7,008,323 B1 3/2006 Hayashi
7,047,503 B1 5/2006 Parrish et al.
D535,659 S 1/2007 Hally et al.
7,170,510 B2 1/2007 Kawahara et al.
7,181,636 B2 2/2007 Kim et al.
7,263,668 B1 8/2007 Lentz
7,274,803 B1 9/2007 Sharma et al.
7,317,812 B1 1/2008 Krahnstoever et al.
D568,892 S 5/2008 Stabb et al.
7,386,782 B2 6/2008 Comps et al.
D572,265 S 7/2008 Guimaraes et al.
7,480,873 B2 1/2009 Kawahara
D590,407 S 4/2009 Watanabe et al.
7,530,030 B2 5/2009 Baudisch
7,536,654 B2 5/2009 Anthony et al.
7,538,776 B2 5/2009 Edwards et al.
D599,812 S 9/2009 Hirsch
D599,819 S 9/2009 Lew
7,587,680 B2 9/2009 Wada
7,614,011 B2 11/2009 Karidis et al.
D607,892 S 1/2010 Murchie et al.
D609,715 S 2/2010 Chaudhri
D619,598 S 7/2010 Maitlen et al.
D619,609 S 7/2010 Meziere
7,797,641 B2 9/2010 Karukka et al.
D624,932 S 10/2010 Chaudhri
7,806,764 B2 10/2010 Brosnan et al.
7,814,436 B2 10/2010 Schrag et al.
7,818,689 B2 10/2010 Wada
7,823,070 B2 10/2010 Nelson et al.
7,840,907 B2 11/2010 Kikuchi et al.
D628,582 S 12/2010 Kurozumi et al.
7,853,896 B2 12/2010 Ok et al.
7,853,897 B2 12/2010 Ogawa et al.
7,865,834 B1 1/2011 van Os et al.
D640,711 S 6/2011 Ng et al.
D642,192 S 7/2011 Arnold
7,979,574 B2 7/2011 Gillo et al.
8,009,022 B2 8/2011 Kipman et al.
8,068,605 B2 11/2011 Holmberg
D650,802 S 12/2011 Jang et al.
8,074,184 B2 12/2011 Garside et al.
D651,608 S 1/2012 Allen et al.
D651,609 S 1/2012 Pearson et al.
8,122,375 B2 2/2012 Ito
D658,195 S 4/2012 Cranfill
D660,861 S 5/2012 Lee et al.
8,176,438 B2 5/2012 Zaman et al.
8,176,439 B2 5/2012 Kamen et al.
8,205,172 B2 6/2012 Wong et al.
8,209,606 B2 6/2012 Ording
8,225,227 B2 7/2012 Headrick et al.
8,230,360 B2 7/2012 Ma et al.
D664,975 S 8/2012 Arnold
8,255,831 B2 8/2012 Araumi
8,261,209 B2 9/2012 Goto et al.
8,444,464 B2 5/2013 Boch et al.
8,449,360 B2 5/2013 Stoddard et al.
8,493,354 B1 7/2013 Birnbaum et al.
8,702,485 B2 4/2014 Flury et al.
8,744,121 B2 6/2014 Polzin et al.
8,745,541 B2 6/2014 Wilson et al.
8,749,557 B2 * 6/2014 Evertt ..................... G06F 3/011 345/473
9,358,456 B1 6/2016 Challinor et al.
9,383,814 B1 * 7/2016 Capper ..................... G06F 3/00
2001/0034014 A1 10/2001 Nishimoto et al.
2002/0019258 A1 2/2002 Kim et al.
2002/0160823 A1 10/2002 Watabe et al.
2003/0063115 A1 4/2003 Kaku et al.
2004/0005924 A1 1/2004 Watabe et al.
2004/0043815 A1 3/2004 Kaminkow
2004/0127285 A1 7/2004 Kavana
2004/0147300 A1 7/2004 Seelig et al.
2004/0184473 A1 9/2004 Tavli et al.
2004/0193413 A1 9/2004 Wilson et al.
2004/0240855 A1 12/2004 Kagle
2005/0014554 A1 1/2005 Walker et al.
2005/0054440 A1 3/2005 Anderson et al.
2005/0108657 A1 5/2005 Han
2005/0159209 A1 7/2005 Fiden et al.
2006/0025282 A1 2/2006 Redmann
2006/0032085 A1 2/2006 Randall
2006/0209019 A1 9/2006 Hu
2006/0252474 A1 11/2006 Zalewski et al.
2006/0266200 A1 11/2006 Goodwin
2007/0010329 A1 1/2007 Craig et al.
2007/0015570 A1 1/2007 Pryzby
2007/0060336 A1 3/2007 Marks et al.
2007/0126874 A1 6/2007 Kake
2007/0139443 A1 6/2007 Marks et al.
2007/0162850 A1 7/2007 Adler et al.
2007/0260984 A1 11/2007 Marks et al.
2007/0265098 A1 11/2007 Shimada et al.
2008/0001950 A1 1/2008 Lin et al.
2008/0009347 A1 1/2008 Radek
2008/0100572 A1 5/2008 Boillot
2008/0132334 A1 6/2008 Nonaka et al.

(56) References Cited

U.S. PATENT DOCUMENTS

2008/0141181 A1 6/2008 Ishigaki et al.
2008/0143722 A1 6/2008 Pagan
2008/0152191 A1 6/2008 Fujimura et al.
2008/0155474 A1 6/2008 Duhig
2008/0188305 A1 8/2008 Yamazaki et al.
2008/0191864 A1 8/2008 Wolfson
2008/0194319 A1 8/2008 Pryzby et al.
2008/0200224 A1 8/2008 Parks
2008/0231926 A1 9/2008 Klug et al.
2008/0234023 A1 9/2008 Mullahkhel et al.
2008/0300053 A1 12/2008 Muller
2009/0027337 A1 1/2009 Hildreth
2009/0069096 A1 3/2009 Nishimoto
2009/0073117 A1* 3/2009 Tsurumi .................. G06F 3/005 345/158
2009/0106667 A1 4/2009 Lyle et al.
2009/0135135 A1 5/2009 Tsurumi
2009/0149257 A1 6/2009 Ferguson et al.
2009/0189775 A1 7/2009 Lashina et al.
2009/0197665 A1 8/2009 Christensen
2009/0213123 A1 8/2009 Crow
2009/0217211 A1 8/2009 Hildreth et al.
2009/0222765 A1 9/2009 Ekstrand
2009/0262118 A1 10/2009 Arikan et al.
2009/0265668 A1 10/2009 Esser et al.
2009/0278796 A1 11/2009 Komazaki
2009/0282335 A1 11/2009 Alexandersson
2010/0009746 A1* 1/2010 Raymond ............... A63F 13/22 463/31
2010/0035682 A1 2/2010 Gentile et al.
2010/0039378 A1 2/2010 Yabe et al.
2010/0064238 A1 3/2010 Ludwig
2010/0087240 A1 4/2010 Egozy et al.
2010/0100848 A1 4/2010 Ananian et al.
2010/0113117 A1 5/2010 Ku et al.
2010/0118033 A1 5/2010 Faria
2010/0120470 A1 5/2010 Kim et al.
2010/0138785 A1 6/2010 Uoi et al.
2010/0151948 A1* 6/2010 Vance ..................... A63F 13/06 463/43
2010/0167823 A1 7/2010 Winkler
2010/0192106 A1 7/2010 Watanabe et al.
2010/0199221 A1 8/2010 Yeung et al.
2010/0216598 A1 8/2010 Nicolas et al.
2010/0231523 A1 9/2010 Chou
2010/0238182 A1 9/2010 Geisner et al.
2010/0245241 A1 9/2010 Kim et al.
2010/0278393 A1 11/2010 Snook et al.
2010/0302145 A1 12/2010 Langridge et al.
2010/0302155 A1 12/2010 Sands et al.
2010/0304860 A1 12/2010 Gault et al.
2010/0306655 A1 12/2010 Mattingly et al.
2010/0306713 A1 12/2010 Geisner et al.
2011/0010667 A1 1/2011 Sakai et al.
2011/0021273 A1 1/2011 Buckley et al.
2011/0080336 A1 4/2011 Leyvand et al.
2011/0083106 A1 4/2011 Hamagishi
2011/0083112 A1* 4/2011 Matsubara ............. G06F 3/011 715/863
2011/0083122 A1 4/2011 Chen et al.
2011/0098109 A1 4/2011 Leake et al.
2011/0105206 A1 5/2011 Rowe
2011/0111850 A1 5/2011 Beerhorst et al.
2011/0151974 A1 6/2011 Deaguero
2011/0169832 A1 7/2011 Brown et al.
2011/0185309 A1 7/2011 Challinor et al.
2011/0195779 A1 8/2011 Lau
2011/0237324 A1 9/2011 Clavin et al.
2011/0238676 A1 9/2011 Liu et al.
2011/0255803 A1 10/2011 Togawa
2011/0291988 A1 12/2011 Bamji et al.
2011/0306396 A1 12/2011 Flury et al.
2011/0306397 A1 12/2011 Fleming et al.
2011/0306398 A1 12/2011 Boch et al.
2012/0052942 A1 3/2012 Esaki et al.
2012/0069131 A1 3/2012 Abelow
2012/0157263 A1* 6/2012 Sivak ...................... G06F 3/014 482/4
2012/0214587 A1* 8/2012 Segal .................... A63F 13/211 463/30
2012/0309477 A1* 12/2012 Mayles ............... A63F 13/5258 463/3
2013/0132837 A1 5/2013 Mead et al.
2013/0203492 A1* 8/2013 Yum ....................... A63F 13/06 463/31
2013/0257807 A1 10/2013 Harris et al.
2014/0208204 A1 7/2014 Lacroix et al.
2015/0141102 A1* 5/2015 Asami ..................... A63F 13/45 463/7

FOREIGN PATENT DOCUMENTS

EP 000859418-0008 2/2008
EP 000890447-0040 4/2008
EP 000890447-0046 4/2008
GB 2330739 A 4/1999
JP 11328124 A 11/1999
JP 2001299975 A 10/2001
WO WO-97/23845 A2 7/1997

OTHER PUBLICATIONS

Van Hook, Daniel J., et al., "Approaches to Relevance Filtering", in Eleventh Workshop on Standards for the Interoperability of Distributed Simulations, Sep. 26-30, 1994, pp. 367-369 (3 pages).
Van Hook, Daniel J., et al., "Approaches to RTI Implementation of HLA Data Distribution Management Services", in Proceedings of the 15th Workshop on Standards for the Interoperability of Distributed Simulations, Orlando, Florida, Sep. 16-20, 1996 (16 pages).
Petty, Mikel D., et al., "Experimental Comparison of d-Rectangle Intersection Algorithms Applied to HLA Data Distribution", in Proceedings of the 1997 Fall Simulation Interoperability Workshop, Orlando, Florida, Sep. 8-12, 1997, 97F-SIW-016 (14 pages).
Singhal, Sandeep K., "Effective Remote Modeling in Large-Scale Distributed Simulation and Visualization Environments", PhD Thesis, Stanford University, 1996 (173 pages).
Singhal, Sandeep K., et al., "Using a Position History-Based Protocol for Distributed Object Visualization", in Designing Real-Time Graphics for Entertainment [Course Notes for SIGGRAPH '94 Course No. 14], Jul. 1994 (25 pages).
Singhal, Sandeep K., et al., "Chapter 5: Managing Dynamic Shared State", in *Networked Virtual Environments—Design and Implementation*, ACM Press Books, SIGGRAPH Series, Jul. 1999 (178 pages).
Microsoft PowerPoint Handbook, 1992 p. 616 (1 page).
Microsoft Office Online Clip Art, http://office.microsoft.com/en=us/clipart/results.aspx?Scope=MC,MM,MP,MS&PoleAssetID=MCJ04316180000&Query=Icons&CTT=6&Origin=EC01017435, retrieved on Feb. 21, 2007 (1 page).
Boombox Icons, http://findicons.com/search/boombox, retrieved on Jul. 31, 2012, copyright 2010 (1 page).
Kuwayama, Yasaburo, "Trademarks & Symbols vol. 2: Symbolical Designs", Van Nostrand Reinhold Company, pp. 14 and 15, 1974 (4 pages).
Thalmann, Daniel, L'animation par ordinateur, XP-002616780, http://web.archive.org/web/20060421045510/http://vrlab.epfl.chi/~thalmann/CG/infogr.4.pdf (52 pages)—French Language.
No Author Given, "BVH File Specification", Character Studio Tutorials, Mar. 21, 2006, XP-002616839, http://web.archive.org/web/20060321075406/http://character-studio.net/bvh_file_specification.htm (16 pages).

* cited by examiner

Front View

Profile View

Top down view

GESTURE-BASED MUSIC GAME

CROSS REFERENCE TO RELATED APPLICATIONS

This application claims priority to U.S. Provisional Patent Application Ser. No. 61/794,570, filed on Mar. 15, 2013, the contents of which is hereby incorporated by reference in its entirety.

FIELD OF THE DISCLOSED SUBJECT MATTER

Some embodiments of the disclosed subject matter relate to video games, and more specifically to gesture-based music games.

BACKGROUND

Although video games and video game consoles are prevalent in many homes, game controllers, with their myriad of buttons and joysticks, are sometimes intimidating and confusing to people that do not often play video games. For these people, using a game controller to interact with the game can be an obstacle to enjoying it. Also, where the game is a dance and/or full-body motion game, often an additional controller is used in the form of a dance mat or dance pad. These dance mats have specific input sections (similar to buttons on a traditional controller) that typically react to pressure from the user's feet. These mats, however, typically take up a lot of space and are often single use controllers—they are used only for dance games and are typically rolled up and stored when not in use.

SUMMARY

At least some of the embodiments described in the present disclosure relate generally to video games and systems used therewith. More specifically, some of the embodiments described herein relate to camera-based interactive game systems that include music and allow for user interaction with the game system in a manner that is responsive to the music.

In general, in an aspect, embodiments of the disclosed subject matter can include a method including displaying, on a display, a multi-part visual cue that instructs a player to perform a gesture at a specified time, the multi-part visual cue including a first part indicating the gesture that is to be performed by the player at the specified time, and a second part providing an indication of i) the specified time, and ii) a preparation period before the specified time, wherein the distance between the first and the second parts is variable over time, receiving, from a video camera, position information associated with positions of at least part of the player over time, determining a first displacement of the at least part of the player using the position information, determining whether the first displacement of the at least part of the player matches a first target displacement criterion associated with the multi-part visual cue, when the first displacement matches the first target displacement criterion within a timing window of the specified time, altering a gameplay characteristic of the video game.

In general, in another aspect, embodiments of the disclosed subject matter can include a video game system including a memory storing computer executable instructions, one or more processors coupled to the memory and configured to execute the instructions such that the one or more processors, cause the display of a multi-part visual cue that instructs a player to perform a gesture at a specified time, the multi-part visual cue including, a first part indicating the gesture that is to be performed by the player at the specified time, and a second part providing an indication of i) the specified time, and ii) a preparation period before the specified time, wherein the distance between the first and the second parts is variable over time, receive, from a video camera, position information associated with positions of at least part of the player over time, determine a first displacement of the at least part of the player using the position information, determine whether the first displacement of the at least part of the player matches a first target displacement criterion associated with the multi-part visual cue, and when the first displacement matches the first target displacement criterion within a timing window of the specified time, alter a gameplay characteristic of the video game.

In general, in still another aspect, embodiments of the disclosed subject matter can include a non-transitory computer readable medium comprising instructions that, when executed by one or more processors, cause the one or more processors to display, on a display, a multi-part visual cue that instructs a player to perform a gesture at a specified time, the multi-part visual cue including, a first part indicating the gesture that is to be performed by the player at the specified time, and a second part providing an indication of i) the specified time, and ii) a preparation period before the specified time, wherein the distance between the first and the second parts is variable over time, receive, from a video camera, position information associated with positions of at least part of the player over time, determine a first displacement of the at least part of the player using the position information, determine whether the first displacement of the at least part of the player matches a first target displacement criterion associated with the multi-part visual cue, and when the first displacement matches the first target displacement criterion within a timing window of the specified time, alter a gameplay characteristic of the video game.

In general, in yet another aspect, embodiments of the disclosed subject matter can include a computerized method including displaying, on a display, a primary cursor that is controlled by a player using a video camera, detecting an interaction between the primary cursor and an object displayed on the display, in response to detecting the interaction, constraining the primary cursor to the object, and displaying a secondary cursor that is controlled by the player via the video camera system to manipulate the object.

At least some of the embodiments described herein can provide one or more of the following capabilities. One or more users can interact with a video game system more efficiently than in the past. One or more users can interact with a video game more naturally than in the past. One or more users can interact with a video game in a more immersive manner than with prior techniques. One or more users can interact with a video game using body gestures, including controlling the progression of the video game. User gestures can be recognized more efficiently when compared with prior techniques. One or more users can interact with a virtual world within a video game more intuitively than in the past. A video game can determine whether users have performed gestures at a specified time more accurately than in the past. A video game can determine whether users have performed a wider variety of gestures than in the past. These and other capabilities will be more fully understood after a review of the following figures, detailed description, and claims.

DETAILED DESCRIPTION

Embodiments of the disclosed subject matter can provide techniques for a player to interact with a video game, such as a music-based video game, using a video camera-based controller. For example, a video game can provide an experience where a player reacts to and/or creates music by moving his or her body. The player's movements can be captured by the video camera-based controller system such that the player can interact with the game using partial- and full-body gestures. In some aspects of the game, the user can be expected to create music by performing certain gestures, and in other aspects of the game, the user can be expected to react to pre-existing music. Certain specialized gestures can be used by the game such as swipe, push, sustain, and path gestures. The player can be prompted to perform certain gestures using two-part, on-screen cues.

In another aspect of the disclosed subject matter, a video game can provide a virtual world populated by objects. A player can interact with these objects using a cursor whose movements are controlled by the player's movements. For example, the video game can use the video camera-based controller to track the movement of either or both of the player's hands (or other body part), and move an on-screen cursor in a way that mimics the movement of the player's hands (or other body part) in two dimensions or three dimensions. A player can interact with objects by, for example, moving the cursor near to or on top of objects in the virtual world (other ways of interacting with objects are possible, e.g., by leaving the cursor on top of an object for a predetermined time). In some embodiments, a two-element cursor can be used: when a player's primary cursor moves near to or on top of an object in the virtual world, the primary cursor can "stick" onto this object, and a secondary cursor can appear. This secondary cursor can be configured to track the movement of the player's hand (or other body part). In this mode, the secondary cursor's motion can now be used to manipulate or change the state of the object that the primary cursor is constrained to.

Other embodiments are possible.

Figure 1A:
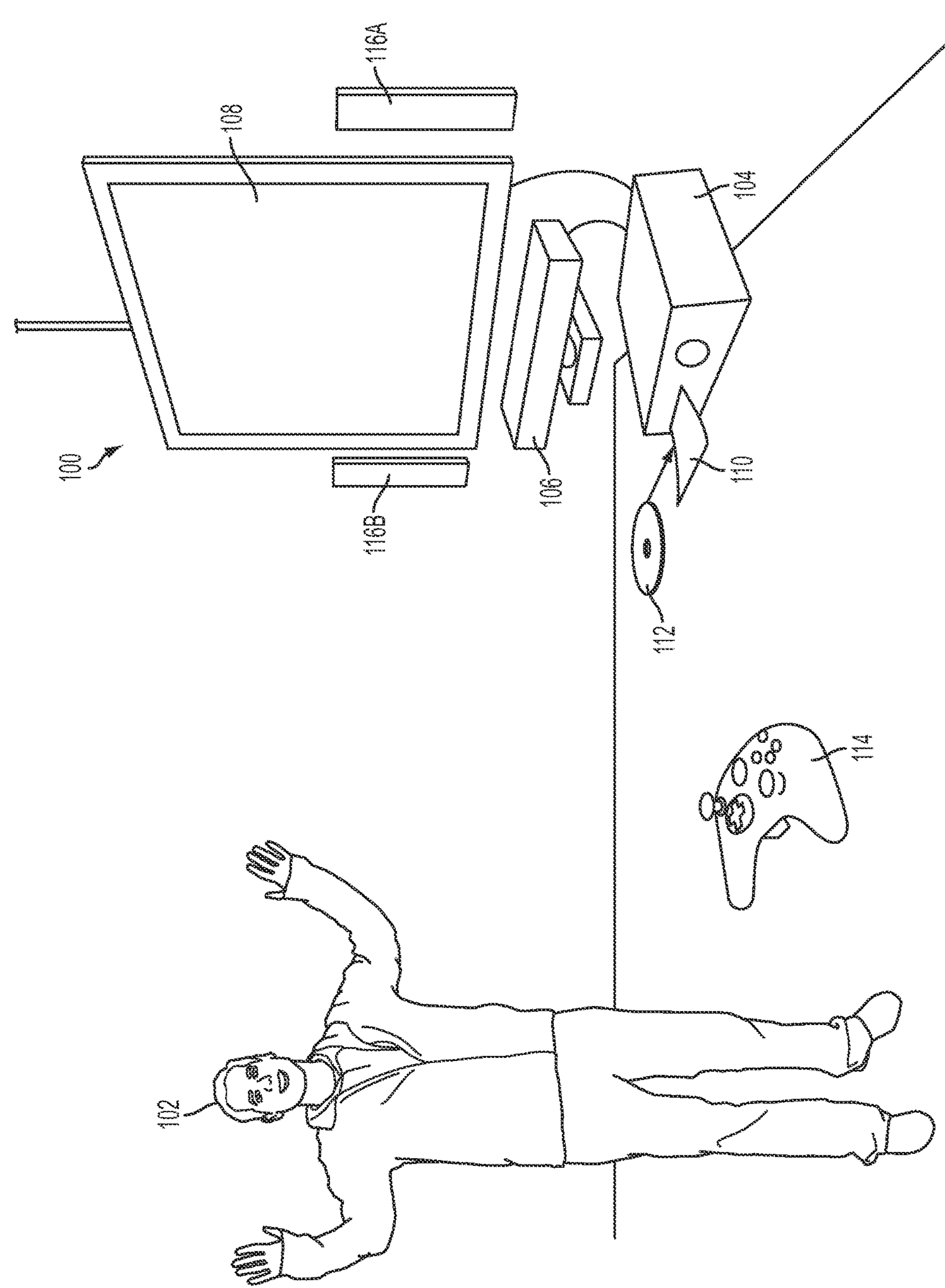
FIG. 1A depicts an exemplary entertainment system with a game system and a camera-based controller.

Referring to FIG. 1A, an entertainment system 100 can include a display screen 108, a video-camera based sensor 106, a game console 104 having a retractable disc holder 110 into which a game disc 112 can be placed, a controller 114 and audio speakers 116 (116A and 116B). The display screen 108 can be, for example, a television, computer monitor, projector, or any other type of display (e.g., a display on a mobile device or tablet device). The game disc 112 can be, for example, a CD or DVD that stores computer readable instructions that are used by game console 104 to provide the video game described herein ("the game"). Additionally, in some embodiments the computer readable instructions used by the game console 104 can be downloaded via a network connection instead of using a physical disc. The controller 114 can be a standard hand-held controller common to most gaming systems (e.g., Xbox controller, Sony PlayStation controller, or Nintendo Wii controller). One or more players 102 can stand in front of the camera 106, which is configured to track the players 102 in real time in, for example, two- or three-dimensions.

While the foregoing paragraph describes the use of a video-camera based sensor 106, this is exemplary only. Other methods for tracking a player's body are possible. For example, in some embodiments, the video camera system 106 can be used with transducers and/or markers attached to the player's body in three dimensions. In other embodiments, the entertainment system 100 can use infrared pointing devices or other motion tracking peripherals. In still other embodiments, the system 106 may not even include a camera (e.g., it could track position/movement using lasers). Regardless of the specific hardware used, preferably the entertainment system 100 can determine the position of a player over time in two- or three dimensions so that information such as motion, velocity, acceleration, and/or displacement can be derived. Additionally, determining position in three dimensions typically makes the techniques described herein easier to implement due to the additional information provided to the game console 104. In some embodiments, it can be desirable to scale the player position information to compensate for different size players.

Figure 1B:
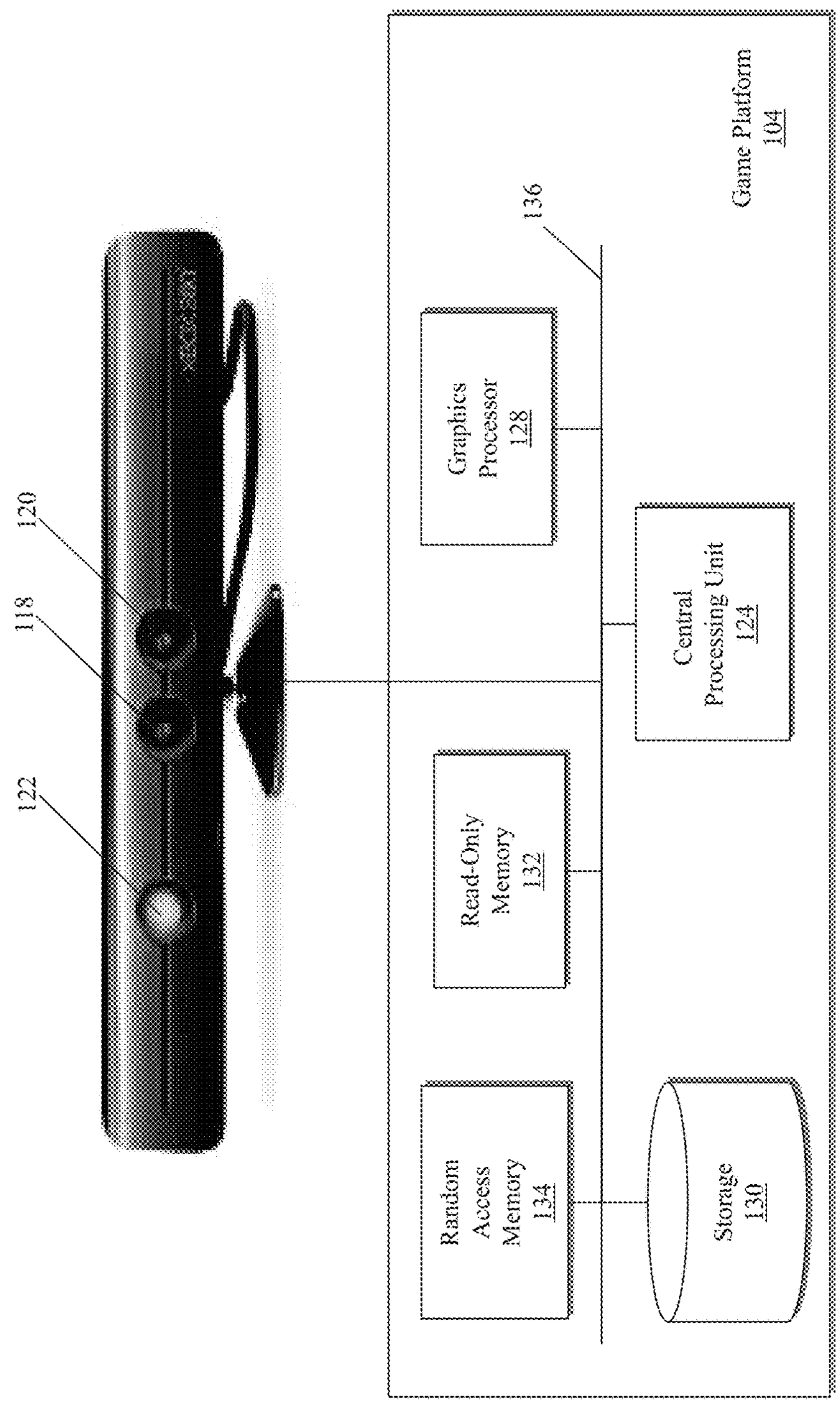
FIG. 1B depicts an exemplary game platform with a MICROSOFT KINECT camera system.

Referring now to FIG. 1B, one embodiment of the entertainment system 100 will now be described in further detail. In some embodiments of the entertainment system 100, the camera 106 can be based on the KINECT framework developed by MICROSOFT. As indicated in FIG. 1B, the KINECT system includes an RGB camera 118, a depth sensor 120, a multi-array microphone 122, and a processor (not shown). The RGB camera 118 can provide a three-color (e.g., Red, Green, Blue) video stream to the game console 104, enabling facial recognition and full-body tracking. The depth sensor 120 is typically an infrared projector combined with a monochrome CMOS sensor, although other configurations of the depth sensor 120 are possible. This typically allows a game console 104 utilizing a KINECT to recognize objects in KINECT's field of view in three dimensions instead of forcing the game console to parse a two-dimensional video-stream. The multi-array microphone 122 can parse voices and sound input, while simultaneously extracting and nullifying ambient noise. The KINECT can also feature a processor with proprietary software that provides the three-dimensional position information of different parts of the user's body at regular increments of time. The KINECT system can provide this information to game console 104, and developers can use this information to build a two- or three-dimensional virtual "skeleton" of the player's body, from which motion data can be derived.

Although the KINECT provides a framework for determining positional information of a user's body, it typically does not provide a means for interpreting the user's movements, including determining whether a user has completed a gesture (as described below) in time with the music, or operating a two-cursor graphic (also as described below).

Referring still to FIG. 1B, the game platform typically includes a Central Processing Unit (CPU) 124, a graphics processor 128, storage component 130 such as a hard drive, Read Only Memory (ROM) 132, Random Access Memory (RAM) 134, all in signal communication via a bus 136. The bus 136 is also typically connected to an input for the KINECT. In some embodiments, the KINECT connects to the game platform 104, e.g., an Xbox 360 or Xbox One, via a Universal Serial Bus (USB) connection.

As used herein, the terms "joint," "bone," "body part," "location on the body," "skeleton" and similar terms are not limited to their respective dictionary definitions and are intended to have the meaning one of skill in the art of motion capture, Kinect-based gaming, and animation would ascribe to them. For example, a skeleton derived from a video camera system can comprise bones, but the number of bones and their positions can be a function of the motion capture equipment and/or animation rig and do not necessarily correlate to the number and positions of bones in a human skeleton. Similarly, a joint is not limited to the point where two bones come together. For example, a joint can be at a distal endpoint of a single bone (e.g., a fingertip or head) or can be located midway along a bone (e.g., in the middle of a femur). Joints can also represent regions of the player's body such as the player's torso or head (even though these do not correspond to an specific bone in the human body.

Figure 1C:
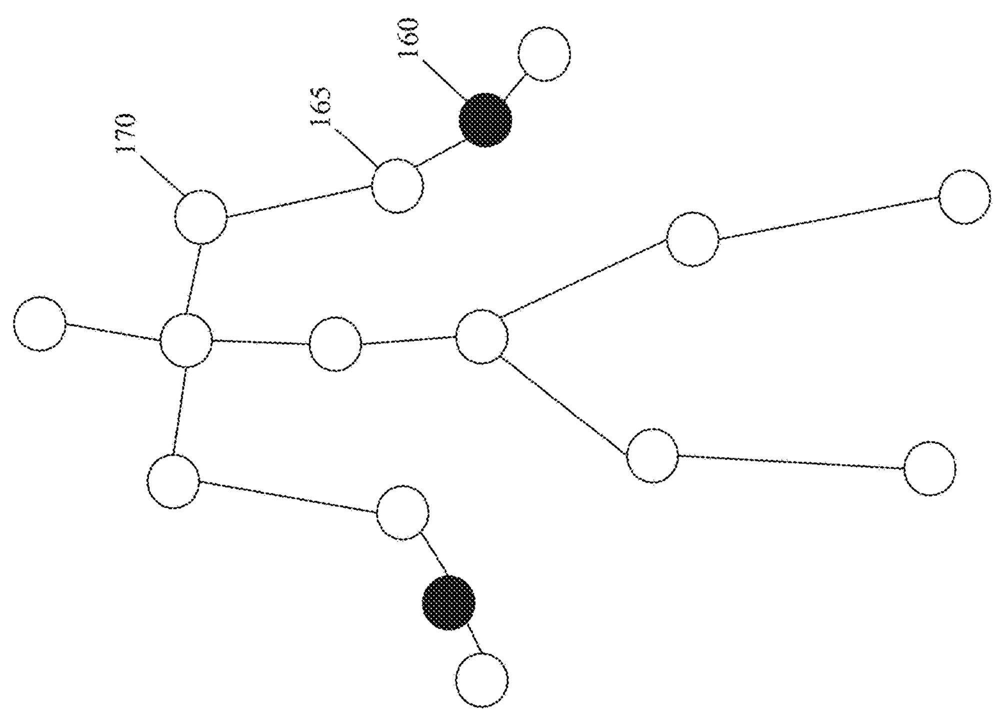
FIG. 1C depicts an example of a skeleton that can be derived from the data provided by the MICROSOFT KINECT camera system.

An example of the KINECT skeleton is shown in FIG. 1C. The skeleton provided by the KINECT provides a framework for the dance game, and allows for tracking of not only limbs generally, but specific joints and/or body parts as well. For example, the wrist joint 160 on the right arm can be treated separately from the right elbow 165, which can be treated differently than the right shoulder 170. Additional portions of the body can also be recognized, such as the pelvis, middle of the torso, the head, the neck, and the knees and feet. As another example, using the KINECT, one can track the position of a body part even though the information provided by KINECT may not correspond directly to an actual body part. Stated differently, the position information provided by KINECT can be a representative abstraction of a real body part (e.g., a "wrist" of the KINECT skeleton may correspond to an actual bone in the player's wrist, a location on the skin surface near the player's wrist, or a location near the player's wrist).

One of the benefits provided by the skeleton-based system is that the skeletal model can be used to calculate scale vectors based on two or more joints. This provides a spatially relative system, e.g., what is the positional distance from body part X to body part Y compared to the positional distance from body part X to body part Z, instead of an absolute coordinate system.

It should be appreciated that the KINECT system typically provides sets of skeleton data representing the position of a player at an instant in time (e.g., each set of skeleton data received from KINECT can include the X/Y/Z coordinates of respective joints). The game running on game platform 104 can then combine the multiple sets of skeleton data to determine motion. The operation of camera 106, and how the data provided therefrom can be processed is described in further detail in U.S. application Ser. No. 12/940,794, filed on Nov. 5, 2010, and Ser. No. 13/828,035, filed on Mar. 14, 2013, both of which are incorporated by reference herein in their entirety. In particular, paragraphs 4-50 (among other paragraphs) of the published application for U.S. application Ser. No. 12/940,794 (i.e., U.S. Pub. No. 2011/0306396) describe the operation of video camera sensors that can track the position of different parts of a player's body. Also, pages 2-9 (among other pages) of the application as filed for U.S. application Ser. No. 13/828,035 also describe the operation of video camera sensors that can track the position of different parts of a player's body.

During gameplay, the game console 104 can output audio such as a musical soundtrack via the audio speakers 116. At the same time, the game console 104 can cause the display screen 108 to display cues that instruct the player 102 to perform certain gestures at specific points in time. The cues displayed by display screen 108 can be timed to coincide with musically significant events in the musical soundtrack played through the audio speakers 116. For example, the cues can correspond to downbeats or with particular climaxes or crescendos in the musical soundtrack.

Using the camera 106, the game console 104 can track in real-time the movement of one or more parts of the body of the player 102 such as the player's left and right hands. By analyzing the positional information (e.g., analyzing the skeleton data received over time) received from the camera 106, the game console 104 can determine whether the player has successfully completed the requested gestures, and can alter a characteristic of the gameplay as a result. For example, the game console 104 can award points depending on how well the player 102 executes gestures in time with the music, or output visual or auditory special effects depending on the actions of the player 102. Once the player has completed (or missed) one cue, the game console 104 can cause the display screen 108 to display the next cue for the next gesture. In some embodiments, the game console 104 can display two or more cues simultaneously, which can be completed by one player using both hands (or using two different body parts), or by two separate players when the game console 104 is operating in a two-player mode. In some embodiments, the game console 104 can be configured to display a succession of cues as part of a song, and can keep track of the player's performance in completing the indicated gestures. At the end of the song, the game console 104 can be configured to display a cumulative score for the player that is based on the player's performance. A gesture can include one or more movements of one or more joints and/or body parts, during one or more times and/or time windows.

Some cues can take the form of a multi-part cue, wherein one part indicates a gesture to be performed by a player and another part indicates a timing of the gesture, including the occurrence of a preparation period leading up to the time at which the gesture is to be performed. Some of the parts of the cue can be stationary, partially fixed, and/or moving. In some embodiments, multiple parts of the cue can collide, or the distance between them can increase or decrease, to indicate when the player is to perform a gesture. For example, in one embodiment a two part cue indicating a gesture to be performed can include a first part that indicates a gesture to be performed by the right and/or left hand of the player and a second part that indicates when the gesture is to be performed and a preparation period leading up to that time. When the first and second parts collide, this can provide an indication of the time when the player is to perform the gesture. Also, the movement of one part along a trajectory can give the player an indication of the time when the player is to perform the gesture. Additionally, in some embodiments the "gesture" to be performed can include keeping a body part motionless for a period of time (e.g., holding the player's right hand still in an extended position for a period of time).

Figure 2B:
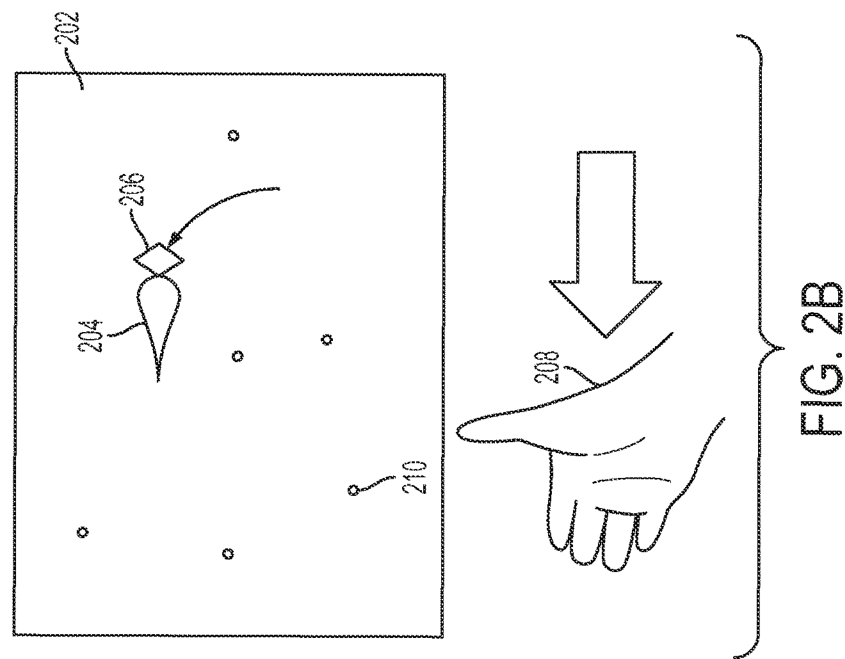
FIGS. 2A and 2B depict an exemplary swipe gesture that can be used with a camera-based controller.
Figure 2A:
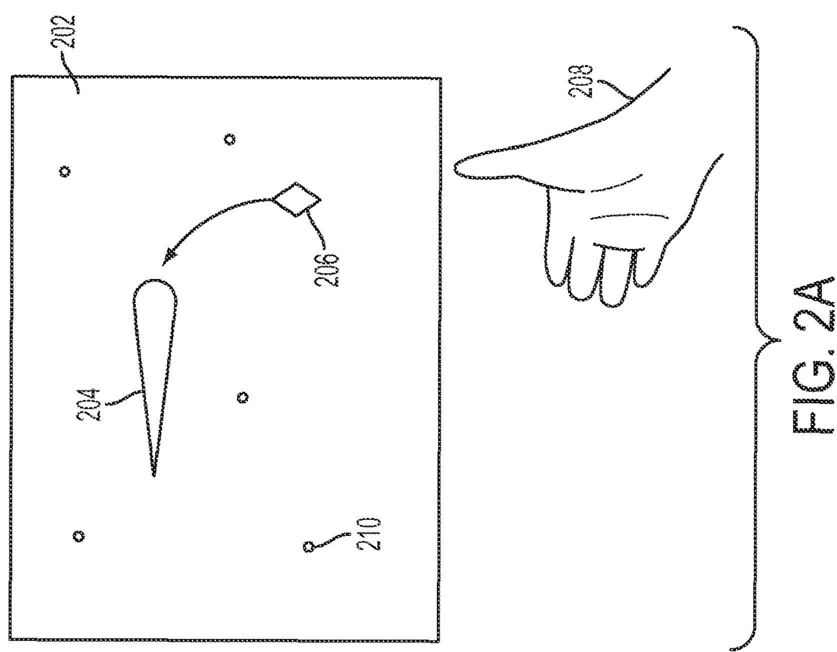

FIGS. 2A and 2B are diagrams illustrating an exemplary swipe gesture. Different aspects of FIGS. 2A and 2B can be changed. In this exemplary embodiment, FIG. 2A shows a least part of a game space 202 which can be displayed on at least part of the display screen 108 at a first time period. Within the game space 202 can be depicted a swipe cue 204 as well as a dart 206, which together can make up a two-part cue. The swipe cue 204 can be shaped like an arrow pointing towards the left of the game space 202. The shape and configuration of the cue 204 can be used to alert the player 102 that the upcoming gesture will be a swipe gesture from right to left (e.g., because it is an arrow that is pointing from right to left), which causes the player to raise his or her hand 208 in preparation for completing the swipe gesture. While FIG. 2A depicts a player's right hand, in some embodiments the player can complete the swipe gesture with either the right or left hand (regardless of which way the cue 204 points).

The dart 206 can take on the appearance of any recognizable shape. In the exemplary embodiment depicted in FIGS. 2A and 2B, dart 206 appears as a small diamond shaped object. In some embodiments, the dart 206 can follow a trajectory that originates from a point inside or outside of the game space 202 shown on the display. The edge a dart emerges from can be based on the direction of the cue arrow it's paired with. For example, if a cue points to the right the dart can come from the default location on the left edge, and if a cue points to the left the dart can come from the right, if a cue points up, the dart can come from a default location at the bottom edge, if a cue points down, the dart can come from a default location at the bottom edge, or the top edge. Darts can also follow a parabolic or semi-parabolic trajectory, where the apex is the cue. In some embodiments, authors or game designers can override the initial position of the dart, and can specify at least one point on the display through which the dart must pass on its way to the cue. In some embodiments, the orientation of the cue 204 is an indication of the direction of the gesture that should be performed (e.g., if the cue 204 points up and to the left at a 45-degree angle, the player should move his or her hand upward and to the left at a 45-degree angle to earn credit).

In the embodiment shown in FIGS. 2A and 2B, at a first point in time, the dart 206 can begin to travel from the bottom right corner of the game space 202 towards the right side of the swipe cue 204, as depicted in FIG. 2A. The dart 206 can also begin to travel from a point outside the game space 202, or outside the area displayed on the display. In some embodiments, this first point in time can be thought of as the beginning of a preparation period, in which the player is alerted to the fact that a swipe gesture should soon be performed, and can prepare accordingly (the preparation period can also start when the dart first appears on the screen and/or at other times). At a second point in time, the dart 206 can contact the right side of swipe cue 204, as depicted in FIG. 2B. The time at which the dart 206 contacts the cue 204 can be referred to as the trigger time (also referred to herein as "t"). In some embodiments, the trigger time can also be indicated by other events, such as when the dart appears to be in the same Z-plane (e.g., be the same distance away from the player) as the cue, when the dart stops moving, when the dart disappears, when the dart takes on the appearance of the cue, when the cue begins to move, when the cue takes on the appearance of the dart. At or about the trigger time, the swipe cue 204 can be triggered to change or morph (e.g., the swipe cue 204 can contract into a shorter, fatter arrow as shown in FIG. 2B). These visual cues (e.g., the touching of dart 206 to swipe cue 204 as well as the changed shape of swipe cue 204) can help alert the player 102 that this is the moment in time when the swipe gesture should be performed (e.g., started, completed, or in progress), and as a result, the player 102 moves his or her hand 208 to the left. Additionally, the dart 206 is preferably displayed in the game space 202 for sufficient time that the user can see the dart 206 and react to it before the contact time. For example, cues can appear 1.1 seconds or 2 beats before the trigger time, and darts can begin their flight 1.1 seconds or 2 beats before the trigger time. Alternatively, cues can appear either 1.1 seconds or 2 beats before the trigger time, depending on which is longer or short, depending on designer/user preference.

Although the swipe gesture should ideally be performed at the trigger time, the game can be configured to determine that the gesture is successfully completed if the player moves his or her hand in the appropriate direction within a time window of the trigger time (e.g., within a short time before or after the trigger time). In other words, if t is the trigger time, the game can be configured to determine that the gesture is successfully completed if the player moves his or her hand in the appropriate direction anytime between $t-\Delta t_1$ and $t+\Delta t_2$, where $\Delta t_1$ and $\Delta t_2$ are typically designer-configurable durations of time, but can also be preprogrammed and/or user-adjustable. In one embodiment, $\Delta t_1$ and $\Delta t_2$ can be 100 ms. In other embodiments, $\Delta t_1$ and $\Delta t_2$ can be of different lengths. Thus, at a high-level, the player can still "get credit" for performing the gesture if the player performs the gesture slightly before or after the trigger time t. In some embodiments, the amount of credit that the player earns can be a function of when the player performed the gesture with respect to the trigger time t. For example, the player can earn more points if they perform the gesture closer to the trigger time t (and, if the gesture takes time to execute, the game can be configured to evaluate, for example, whether the beginning time, the middle time, or the ending time is close to the trigger time).

The game space 202 can further include a plurality of particles 210 interspersed throughout, which can appear as motes or particles of light and color, or which can exhibit the appearance of other small shapes. These particles 210 can move through game space 202 (or stay still) and can be altered to enhance gameplay and/or provide feedback to the user. For example, the particles 210 can be programmed to respond to the motions of the player's hand 208. As another example, the particles 210 can move in the direction of the player's hand. Furthermore, if the player successfully completes the swipe gesture, the particles 210 can change color, increase their brightness or size, or swirl in an agitated state. The number of particles does not have to be constant, and can increase or decrease throughout the game, whether in response to the player's actions or independent of the player's actions. For example, if the player completes a gesture or a number of gestures correctly, the number of particles can increase. The particles 210 can therefore provide a more immersive and interactive experience for the player 102.

While FIGS. 2A and 2B depict a specific embodiment of the swipe cue 204, other configurations are possible. For example, the swipe cue 204 can be other shapes and sizes, and can be oriented arbitrarily in any direction at any location in the game space 202 (e.g., positioned in the bottom middle of the screen and oriented up and to the left at a 45 degree angle). Furthermore, while FIGS. 2A and 2B depict a dart 206 that travels from the bottom right of the game space 202 towards the right side of the swipe cue 204, dart 206 can originate from any part of the game space 202 (or even outside the game space 202 shown on the display) and can contact any part of the swipe cue 204. Finally, while FIGS. 2A and 2B illustrate the player's hand 208 with the thumb extended, it is to be understood that the game does not require any particular configuration of the player's fingers.

Figure 2C:
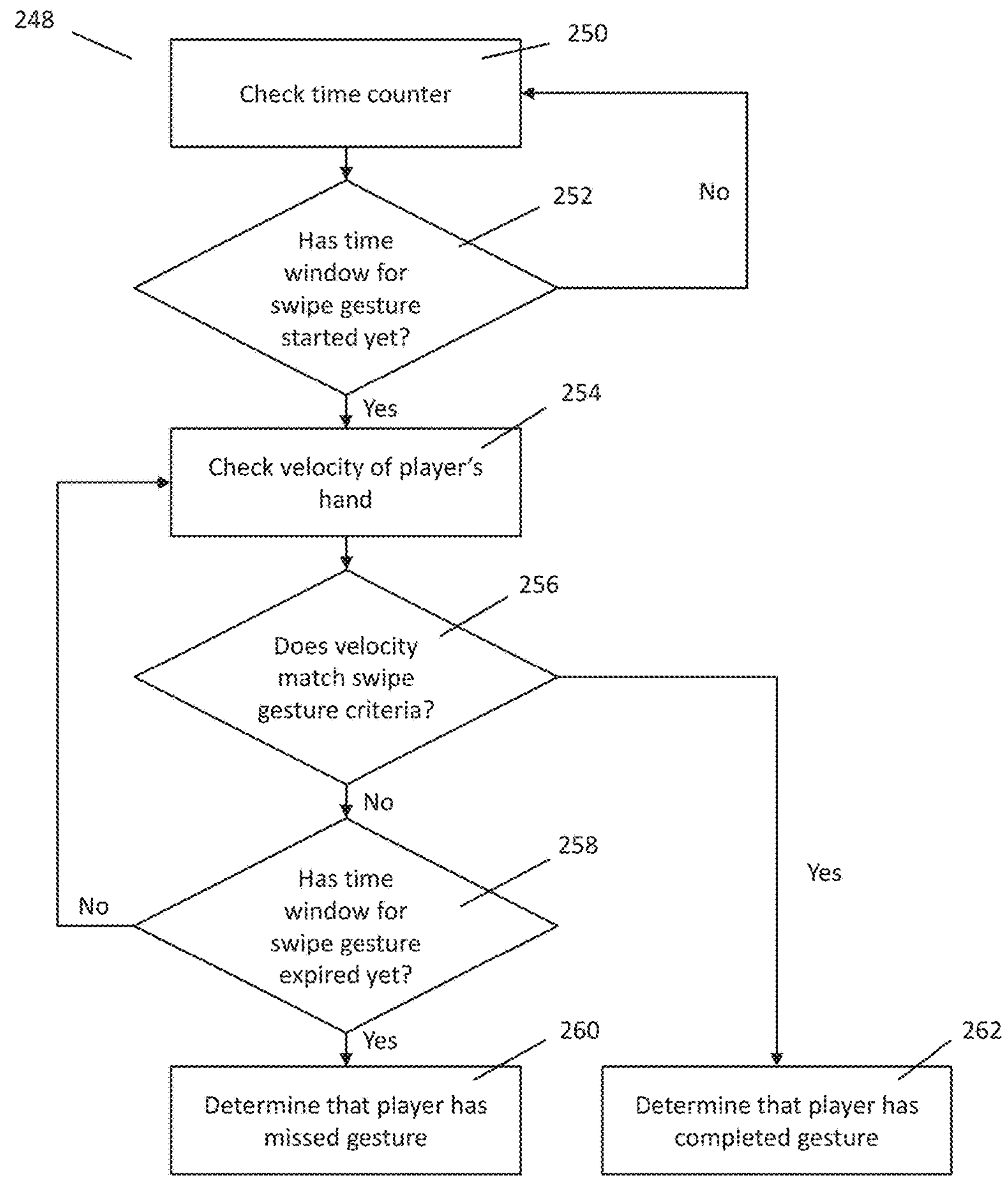
FIG. 2C is a flowchart depicting exemplary steps to determine whether a player has completed a swipe gesture.

In operation, referring to FIG. 2C, with further reference to FIGS. 1, 2A, and 2B, a process 248 that can be used to determine whether the player 102 has successfully completed a swipe gesture, using the system 100, includes the stages shown. The process 248, however, is exemplary and not limiting. The process 248 can be altered, e.g., by having stages added, altered, removed, or rearranged. While the process 248 assumes that a time window is being used, this is not required. In some embodiments, the process 248 is implemented by a processor that is part of the game console 104 and/or camera 106.

At stage 250 the game can determine the current time. This can be done using, for example, a timer or clock in the game console 104. The time can also be measured using a beat clock, such that time is indexed using a current beat or fraction of a beat instead of real time (e.g., seconds or milliseconds). Indexing time using a beat clock can differ from indexing using real time because the beat can be variable through the duration of a song.

At stage 252, in embodiments where a time window is used, the game can determine whether the time window for the swipe gesture has started yet, e.g., whether time $t—\Delta t_1$ has arrived. If yes, the process 248 can continue to stage 254. Otherwise, the process 248 can continue back to stage 250.

At stage 254, the process 248 can check the velocity of a predetermined point, joint, and/or reference point on the player's body (in some embodiments, these can be points in a Kinect skeleton, as discussed above) such as the player's hand 208 (or other body part, such as the player's head, left or right elbow, shoulder, knee or foot). The velocity that the process 248 checks can include a subset of component velocities related to the player's hand 208 (or other body part), e.g., velocity in the X, Y, or Z direction. In some embodiments, the game can be configured to check the velocity of multiple predetermined points on the player's body (e.g., both of the player's hands) in stage 254. In some embodiments, camera 106 does not provide velocity information directly, but only positional information of parts, joints, and/or other reference points of the player's body at successive points in time (e.g., provides successive frames of positional data). Game console 104 can then compute velocity by sampling the position of a specific body part, joint, and/or reference point between 2 frames, and then dividing the displacement between these two positions by the time between the frames. The frames chosen need not be consecutive (e.g., game console 104 can consider only every third or fourth frame). In some embodiments, the frames that are chosen can be aligned with the beat of the music. In some of these embodiments, whether used in relation to this Figure or other Figures, the term "velocity" used herein need not refer to strict velocities (e.g., distance divided by a constant amount of real time) because "velocities" can be calculated using a beat clock, in which the duration of a beat can be variable throughout the course of a song.

While this figure, and other figures herein discuss measuring the velocity, displacement and other characteristics can be used as well. For example, throughout the embodiments descried herein, rather than determining the velocity, a displacement, speed, trajectory, and/or acceleration can be calculated instead. In each instance, this can be an instantaneous, average, mean, and/or median value (e.g., velocity can be derived by averaging the velocity computed over several different frames from the video camera).

At stage 256, the process 248 can check if the measured velocity of the player's hand 208 matches one or more pre-programmed swipe gesture criterion. Swipe gesture criteria can include, for example, the direction of the hand 208's velocity (e.g., left, right, up, down, towards the screen and away from the screen). Swipe gesture criteria can also include, for example, a threshold magnitude of the player's hand 208's velocity, such that a gesture is only completed if the player's hand 208 is moving at a certain speed (this threshold speed can be computed relative to some body unit indicative of the size of the player's body). In yet other embodiments, evaluating whether the player's hand's velocity matches the swipe gesture criteria can include taking the dot product of the direction of the corresponding joint with the direction of the cue, and then determining if the magnitude is greater than a threshold. In other embodiments, the game can compute the square of the cosine of the angle between the direction of the corresponding joint and the direction of the cue, which can narrow the "correct" band and can help prevent the game from responding to flailing arms. In this instance, since the swipe cue 204 is directing the player to move his hand towards the left, the swipe gesture criteria can require that the player's hand move in the appropriate direction (e.g., towards the left) with a certain minimum speed and/or distance. If the game determines that the velocity of or distance traveled by the player's hand 208 matches the swipe gesture criteria, the process 248 can branch to stage 262, otherwise the process 248 can continue to stage 258. In some embodiments, if process 248 checks the velocity of both of the player's hands in stage 254, the process 248 can be configured to determine whether the velocity of either hand satisfies the gesture criteria in stage 256. If there are multiple cues displayed, the game can check whether each cue that is available to a particular player was satisfied by the player's movement. If there are two cues in the same direction, one cue can be configured to be completed by the player's left hand, while the other cue can be configured to be completed by the player's right hand—in this way, only one cue will be satisfied by a swipe by one hand.

At stage 258, the process 248 can check whether the time window for the swipe gesture has expired, (e.g., whether time $t+\Delta t_2$ has arrived). If the time window has not yet expired, the process 248 can branch back to stage 254. Otherwise, the process can continue to stage 260.

At stage 260, the process 248 can indicate that the player 102 has missed the swipe gesture (e.g., the velocity of the player's hand never matched the swipe gesture criteria during the time window, or matched for less than a threshold time).

At stage 262, the process 248 can determine that the player 102 has completed the swipe gesture. The process 248 can, for example, credit the player 102 with "points," unlock other features within the game, and/or alter a game-play characteristic based on the determination that the player has completed the gesture.

In some embodiments, the process 248 can require that the player's movement match the gesture criteria for some minimum threshold amount of time (or fractional number of beats). This may require, for example, checks of the player's movement at multiple points in time, rather than just a single point in time.

Figure 3B:
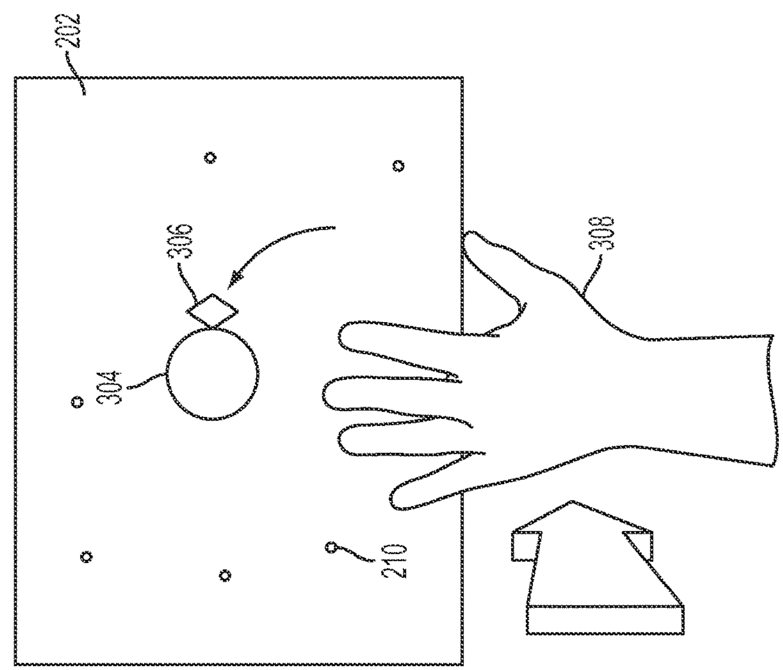
FIGS. 3A and 3B depict an exemplary push gesture.
Figure 3A:
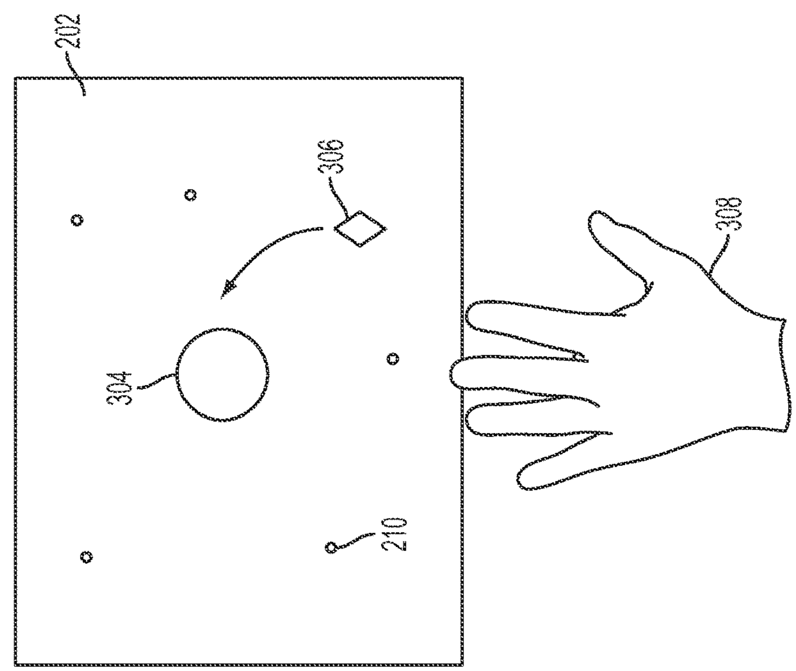

FIGS. 3A and 3B are diagrams illustrating an exemplary push gesture that can operate in a similar manner as the swipe gestures described above. Different aspects of FIGS. 3A and 3B can be changed. In this exemplary embodiment, just as with FIGS. 2A and 2B, FIGS. 3A and 3B show at least part of a game space 202 which can be displayed on at least part of the display screen 108 at a first and a second time periods. At the first time period, the game space 202 includes a push cue 304, which can be shaped like a circle—this alerts the player 102 that the upcoming gesture will be a push gesture (e.g., a gesture that includes a movement in the Z direction), which causes the player to raise his hand 308 in preparation for completing the push gesture. It should be noted that while FIG. 3A depicts a player 102's left hand, the player 102 can complete the push gesture with either his right or left hand, or some other body part (e.g., the player's head, left or right shoulder, elbow, knee, or foot). FIGS. 3A and 3B also include particles 210, which can operate in the same way as described above in relation to FIGS. 2A and 2B.

In the embodiments shown in FIGS. 3A and 3B, at a first point in time, the dart 306 can begin to travel from the bottom right corner of the game space 202 towards the right side of the push cue 304 (e.g., like that described above with respect to FIGS. 2A and 2B). This first point in time can be thought of as the beginning of a preparation period, in which the player is alerted to the fact that a push gesture should soon be performed, and can prepare accordingly (the preparation period can also start when the dart first appears on the screen and/or at other times). At a second point in time, the dart 306 can contact the right side of push cue 304, as depicted in FIG. 3B. The time at which the dart 306 contacts the push cue 304 can be referred to as the trigger time (also referred to herein as "t"). As described above in FIGS. 2A and 2B, the trigger time can also be indicated by other events. This visual cue at the trigger time can help alert the player 102 that this is the moment in time when the push gesture should be completed, started, or in progress, and as a result, the player 102 moves his hand 308 towards the screen in a pushing gesture. Just as with swipe gestures, although the push gesture should ideally be completed at this moment in time, the game can be configured to determine that the gesture is successfully completed if the player moves his hand in the appropriate direction within a narrow time window, i.e., within a short time before the trigger time, or within a short time after the trigger time. In other words, if t is the trigger time, the game can be configured to determine that the gesture is successfully completed if the player moves his hand in the appropriate direction (and perhaps also, at the appropriate speed) anytime between $t—\Delta t_1$ and $t+\Delta t_2$, where $\Delta t_1$ and $\Delta t_2$ are typically designer-configurable and/or user configurable durations of time (wherein time can be measured in either seconds or beats). In one embodiment, $\Delta t_1$ and $\Delta t_2$ can be 100 ms. In another embodiment, $\Delta t_1$ and $\Delta t_2$ can be of different lengths. Thus, at a high-level, the player can still "get credit" for performing the gesture if the player performs the gesture slightly before or after the contact time t. In some embodiments, the amount of credit that the player earns can be a function of how close the player performed the gesture to the contact time t (e.g., the player can earn more points if they perform the gesture closer to the contact time t).

While FIGS. 3A and 3B depict a dart 306 that travels from the bottom right of the game space 202 towards the right side of the push cue 306, it is to be understood that the dart 306 can originate from any part of the game space 202 (on or off the display) and can contact any part of the push cue 304. Furthermore, while FIGS. 3A and 3B depict the push cue 304 as a circle, and the dart 306 as a diamond, it is to be understood that both of these cues can be displayed as any other recognizable shape. For example, the dart 306 can have the appearance of a circle that is travelling in the Z-direction (e.g., away from the player and deeper into the virtual space), and the trigger time can be specified as the point in time where the dart 306 (shaped like a circle) appears to be in the same Z-plane as push cue 304 (e.g., appear to be the same distance away from the player in the virtual space), when the circle of the dart 306 appears to have the same circumference, or be of the same size as, push cue 304, or when the circle of the dart 306 merges with push cue 306. Also, while FIGS. 3A and 3B illustrate the player's hand 308 with the fingers outstretched, the game does not require any particular configuration of the player's fingers.

Figure 3C:
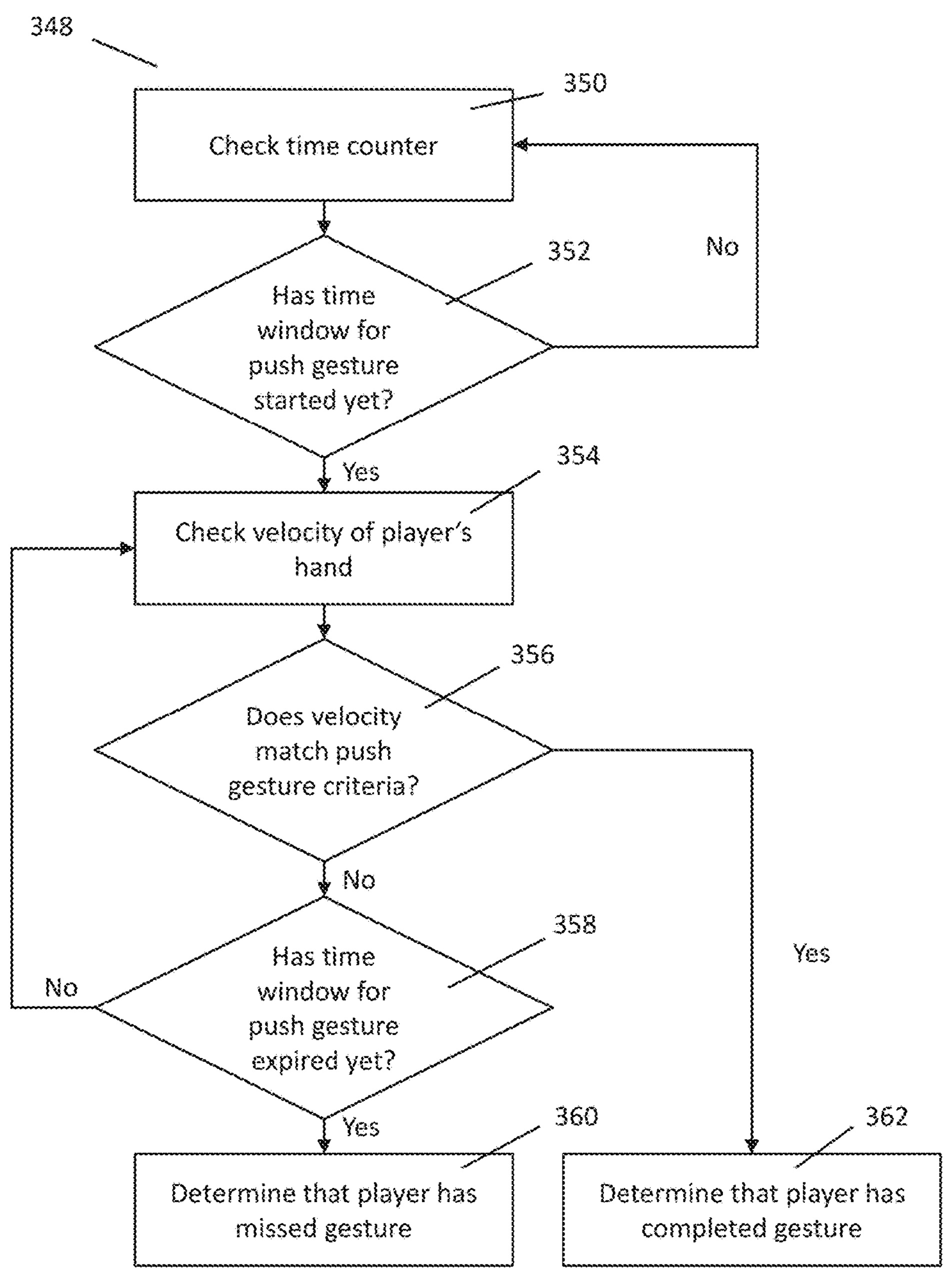
FIG. 3C is a flowchart depicting exemplary steps to determine whether a player has completed a push gesture.

In operation, referring to FIG. 3C, with further reference to FIGS. 1, 3A and 3B, a process 348 that can be used to determine whether the player 102 has successfully completed a push gesture using the system 100, includes the stages shown. Similar to process 248 discussed above, process 348 is exemplary and not limiting. The process 348 can be altered, e.g., by having stages added, altered, removed or rearranged. While the process 348 assumes that a time window is being used, this is not required. In some embodiments, the process 348 is implemented by a processor that is part of the game console 104 and/or camera 106.

At stage 350, the game can determine the current time. This can be done using, for example, a counter or clock in game console 104. The time can also be measured using a beat clock, such that time is indexed using a current beat or fraction of a beat instead of real time (e.g., seconds or milliseconds). Indexing time using a beat clock can differ from indexing using real time because the beat can be variable through the duration of a song.

At stage 352, in embodiments where a time window is used, the game can determine whether the time window for the push gesture has started yet, e.g., whether time $t-\Delta_1$ has arrived. If yes, process 348 can continue to stage 354. Otherwise, the process 348 can continue back to stage 350.

At stage 354, the process 348 can check the velocity of the player's hand 308 (or other body part, such as the player's head, left or right elbow, shoulder, knee or foot). The velocity that the process 348 checks can include a subset of component velocities related to the player's hand 308 (or other body part), e.g., in the X, Y, or Z direction. In some embodiments, the game can be configured to check the velocity of both of the player's hands in stage 354, perhaps by using some of the procedure discussed above in relation to FIG. 2 and stage 254.

At stage 356, the game can check if the measured velocity of the player's hand 308 matches one or more pre-programmed push gesture criteria. Push gesture criteria can include, for example, the direction of the hand 308's velocity (e.g., left, right, up, down, towards the screen and away from the screen). Push gesture criteria can also include, for example, a threshold magnitude of the player's hand 308's velocity, such that a gesture is only completed if the player's hand 308 is moving at a certain absolute speed. In this instance, since the push cue 304 is directing the player to move his hand towards the screen, the push gesture criteria can require that the player's hand move in the appropriate direction (e.g., towards the screen) with a certain minimum speed. If the game determines that the velocity of or distance traveled by the player's hand 308 matches the push gesture criteria, the process 348 can branch to stage 362, otherwise the process 348 can continue to stage 358. In some embodiments, if process 348 checks the velocity of both of the player's hands in stage 354, the process 348 can be configured to determine whether the velocity of either hand satisfies the gesture criteria in stage 356. At stage 358, the process 348 can check whether the time window for the push gesture has expired (e.g., whether time $t+\Delta t_2$ has arrived). If the time window has not yet expired, the process 348 can branch back to stage 354. Otherwise, the process can continue to stage 360.

At stage 360, the process 348 can indicate that the player 102 has missed the push gesture (e.g., the velocity of the player's hand never matched the push gesture criteria during the time window, or matches for less than a threshold time).

At stage 362, the process 348 can indicate that the player 102 has completed the push gesture. The process 348 can, for example, credit the player 102 with "points," unlock other features within the game, and/or alter a gameplay characteristic based on the determination that the player has completed the gesture.

In some embodiments, the process 348 can require that the player's movement match the gesture criteria for some minimum threshold amount of time (or fractional number of beats). This may require, for example, checks of the player's movement at multiple points in time, rather than just a single point in time.

Figure 4A:
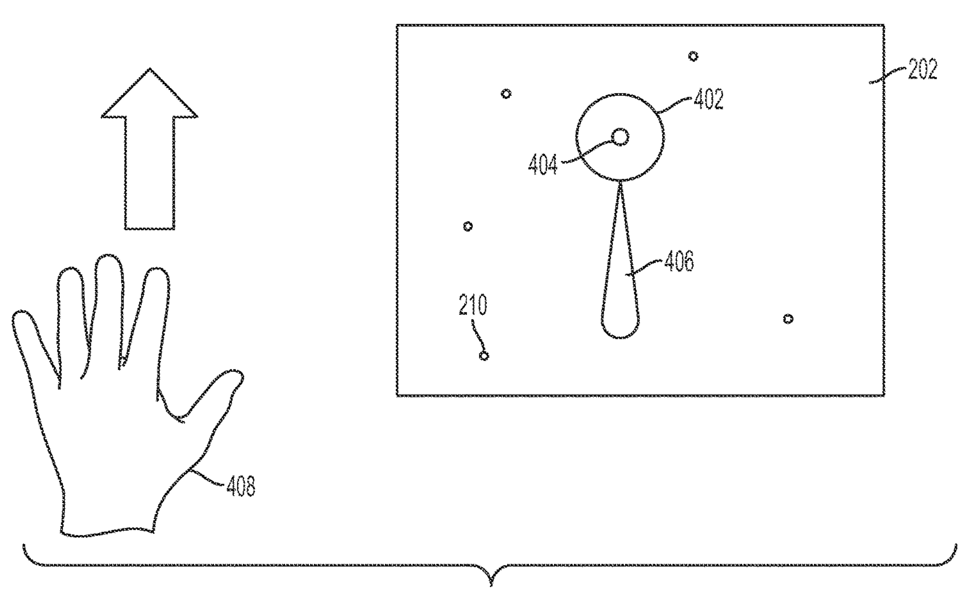
FIGS. 4A and 4B depict an exemplary sustain gesture.
Figure 4B:
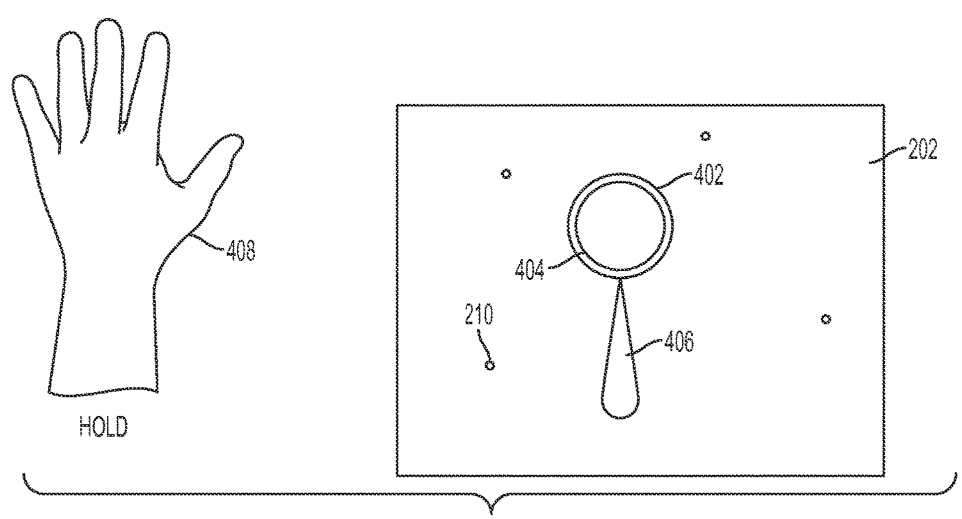

FIGS. 4A and 4B are diagrams illustrating an exemplary sustain gesture that can operate in a similar manner as the swipe and push gestures described above. Different aspects of FIGS. 4A and 4B can be changed. In this exemplary embodiment, sustain gestures can take place immediately after a swipe, push and/or path gesture, as illustrated in FIGS. 4A and 4B. FIGS. 4A and 4B display a portion of a game space 202 which is displayed on at least part of the display screen 108 at a first and a second time period. FIGS. 4A and 4B also include particles 210, which can operate in the same way as described above in relation to FIGS. 2A and 2B.

In the embodiment shown in FIGS. 4A and 4B, during a first time period, the player 102 is executing the swipe gesture indicated by swipe cue 406 on the game space 202. Since swipe cue 406 is pointed upwards in this instance, the player's hand 408 is moving upward. At the end of the push cue is located a "sustain" cue, which can comprise an inner sustain cue 404, and an outer sustain cue 402. In one embodiment, the outer sustain cue 402 can be shaped like a large, hollow circle, while the inner sustain cue 404 can be shaped like a small, solid circle. The appearance of inner sustain cue 404 and outer sustain cue 402 can alert the player 102 that the upcoming gesture will be a sustain gesture. Therefore, even though the player's hand is moving in this first time period, this first time period can be thought of as a preparation period because the player is alerted to the fact that a sustain gesture is coming, and can prepare accordingly. It should be noted that while FIGS. 4A and 4B depict a player's left hand, the player can complete the sustain gesture with either his right or left hand, or with other parts of his or her body, such as her head, left or right shoulder, elbow, knee, or foot.

During a second time period, as depicted in FIG. 4B, the inner sustain cue 404 expands so that it fills more and more of the hollow circle formed by outer sustain cue 402. The time at which the inner sustain cue 404 begins to expand can be referred to as the trigger time (also referred to herein as "t"). This visual cue alerts the player 102 that this is the moment in time when the sustain gesture should be performed, and as a result, the player 102 holds his hand 408 still. Although the sustain gesture should ideally be started at the trigger time, the game can be configured to determine that the gesture is successfully started even if the player stops the motion of his hand slightly after the trigger time. In other words, if t is the trigger time, the game can be configured to determine that the sustain gesture is successfully started if the player stops the motion of his hand anytime between t and $t+\Delta t$, where $\Delta t$ is a typically designer-configurable or user configurable duration of time, for example, 100 ms. Thus, at a high-level, the player can still "get credit" for performing the sustain gesture if the player performs the sustain gesture slightly before or after the time t. In some embodiments, the amount of credit that the player earns can be a function of how close the player performed the sustain gesture to the contact time t (e.g., the player can earn more points if they perform the gesture closer to the contact time t).

In some embodiments, the player holds his hand 408 in this position until the inner sustain cue 404 completely fills up the hollow circle formed by outer sustain cue 402, which signifies to the player that the sustain cue has been completed. This time can be referred to as the release time. At this point, the player can move his hand again. Just as with the beginning of the sustain cue, although the sustain gesture should ideally be completed at the release time, the game can be configured to determine that the gesture is successfully completed even if the player begins moving his hand slightly before the release time.

Figure 4C:
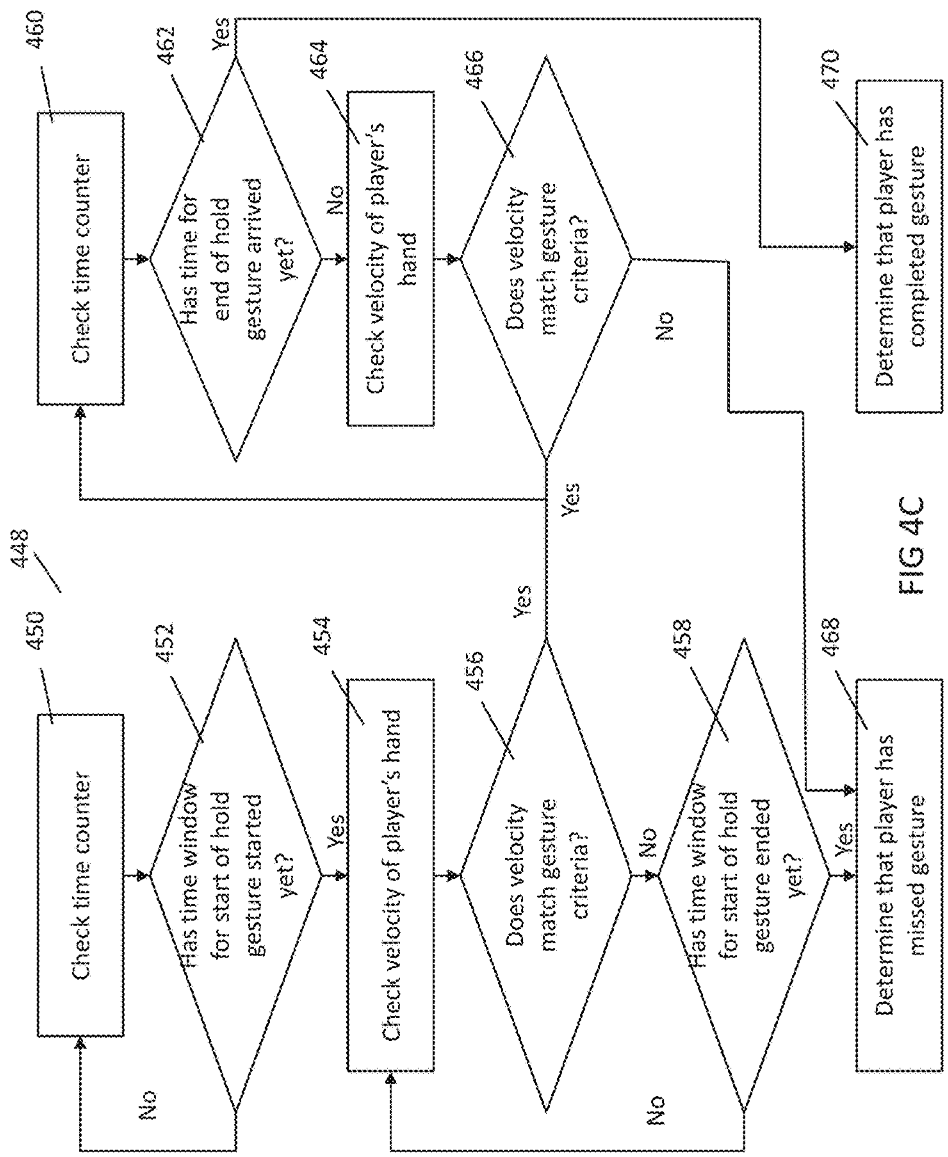
FIG. 4C is a flowchart depicting exemplary steps to determine whether a player has completed a sustain gesture.

In operation, referring to FIG. 4C, with further reference to FIGS. 1, 4A, and 4B, a process 448 that can be used to determine whether the player 102 has successfully completed a sustain gesture, using the system 100, includes the stages shown. The process 448 can be altered, e.g., by having stages added, altered, removed, or rearranged. While the process 448 assumes that time windows around the trigger and release times are being used, this is not required. In some embodiments, the process 448 is implemented by a processor that is part of the game console 104 and/or camera 106.

At stage 450, the game can determine the current time. This can be done using, for example, a timer or clock in the game console 104. The time can also be measured using a beat clock, such that time is indexed using a current beat or fraction of a beat instead of real time (e.g., seconds or milliseconds). Indexing time using a beat clock can differ from indexing using real time because the beat can be variable through the duration of a song.

At stage 452, in embodiments where time windows are used, the game can determine whether the time window for the start of the sustain gesture has started yet, i.e., whether trigger time t has arrived. If yes, the process 448 can continue to stage 454. Otherwise, the process 448 can continue back to stage 450.

At stage 454, the process 448 can check the velocity of the player's hand 408 (or other body part, such as the player's head, left or right elbow, shoulder, knee or foot). The velocity that the process 448 checks can include a subset of component velocities related to the player's hand 408 (or other body part), e.g., in the X, Y, or Z direction. In some embodiments, the game can be configured to check the velocity of both of the player's hands in stage 454, perhaps by using some of the procedure discussed above in relation to FIG. 2 and stage 254.

At stage 456, the process 448 can check if the measured velocity of the player's hand 408 matches one or more of the sustain gesture criterion. Sustain gesture criterion can require, for example, that the player's hand 408's velocity be below a certain threshold magnitude in any direction. If the game determines that the velocity of the player's hand 408 matches the sustain gesture criterion, the process 448 can branch to stage 460, otherwise, the process 448 can continue to stage 458. In some embodiments, if process 448 checks the velocity of both of the player's hands in stage 454, the process 448 can be configured to determine whether the velocity of either hand satisfies the gesture criteria in stage 456.

At stage 458, the process 448 checks whether the time window for the start of the sustain gesture has expired yet, i.e., whether time t+Δt has arrived. If the time window has expired, the game branches to stage 468, otherwise the game continues back to stage 456.

At stage 468, the process 448 determines that the player has missed the sustain gesture.

At stage 460, the game re-checks the time counter. This can be provided by a timer or clock in the game console 104. This can also be provided using a beat clock, as discussed above.

At stage 462, the game checks whether the time for the end of the sustain gesture (e.g., the release time) has arrived yet. If the release time has arrived, the process 448 branches to stage 470, otherwise, the process 448 continues to stage 464.

At stage 470, the game can indicate that the player 102 has completed the sustain gesture.

At stage 464, the game again checks the velocity of the player's hand 408 (or other body part). For example, the process 448 can use a process similar to that described in relation to stage 454. Stage 464 can also be modified in the ways discussed in relation to stage 454.

At stage 466, the game can check if the velocity of the player's hand 408 (or other body part) match further sustain gesture criteria. Such further sustain gesture criteria can require, for example, that the player's hand 408's velocity be below a certain threshold magnitude. The further sustain gesture criteria checked in stage 466 can be the same as those in stage 456, or they can be different than those in stage 456. If the player's hand's velocity matches the further sustain gesture criteria, the process 448 can branch back to stage 460. Otherwise, the process 466 can branch to stage 468, and determine that the player has missed the gesture. Stage 466 can also be modified in the ways discussed in relation to stage 456.

The loop involving stages 460, 462, 464 and 466 can continue until the time for the end of the sustain gesture arrives (e.g., the release time, or a time slightly before the release time). At that point, the process 448 branches to stage 470, in which the process 448 can indicate that the player 102 has completed the sustain gesture. In some embodiments, the player can get partial credit for a sustain that was held for only some of the time between the start and release time. Also in some embodiments, the player's motion can go through a smoothing filter to produce a running average. This smoothing filter can remove jitter, which can be a side effect of using camera 106 to capture the player's movements. Smoothing filters can be used at any stage of any gesture recognizer (e.g., smooth the joint position, or smooth the velocity, or smooth the dot product of the velocity with the cue direction).

Figure 5A:
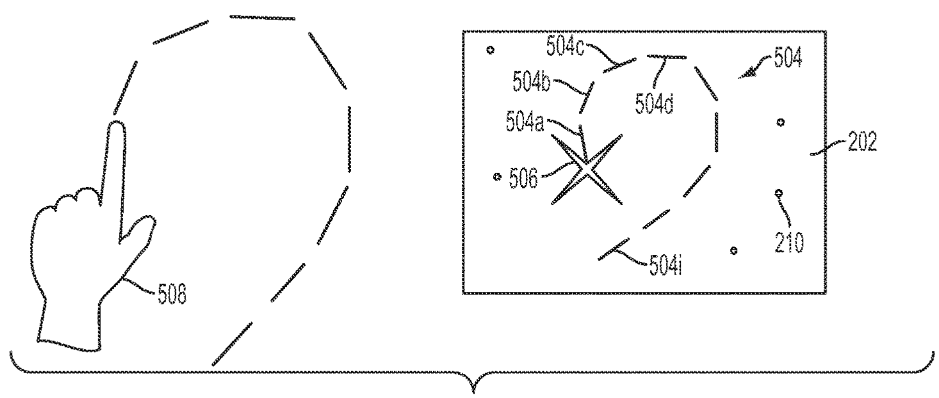
FIGS. 5A, 5B and 5C depict an exemplary path gesture.
Figure 5B:
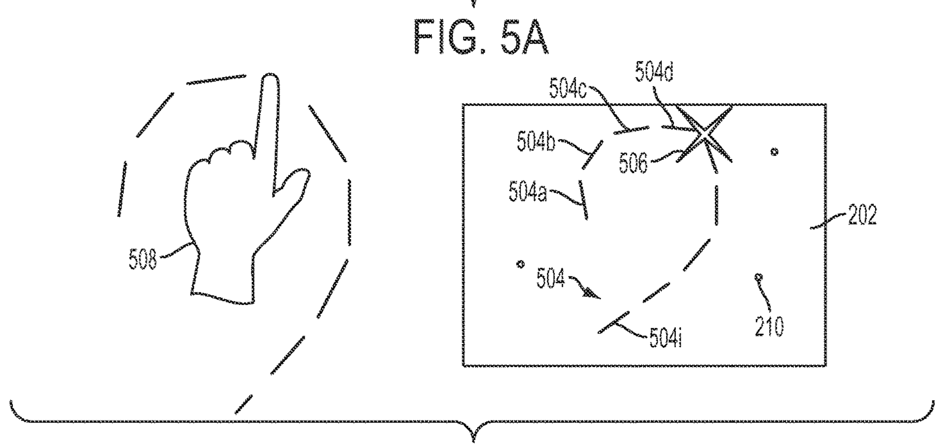
Figure 5C:
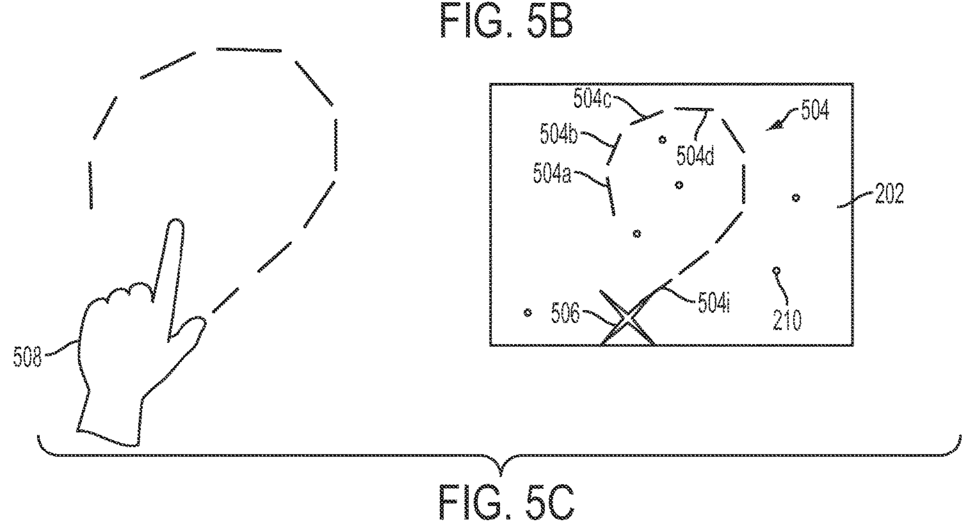

FIGS. 5A, 5B and 5C are diagrams illustrating an exemplary path gesture, which can operate in a manner similar to the gestures described above. Different aspects of FIGS. 5A, 5B and 5C can be changed. In this exemplary embodiment, FIGS. 5A, 5B and 5C show exemplary screen displays at first, second, and third points in time. A path cue 504 is depicted in the game space 202, on which is depicted a current position cue 506 (e.g., a star). Path cues can instruct the player 102 to trace out the pattern represented by path cue 504 in time with the progress indicated by current position cue 506. Path cue 504 can be broken into a plurality of path segments 504*a*, 504*b*, 504*c*, etc. FIGS. 5A, 5B and 5C can also include particles 210, which operate in the same way as described above in relation to FIGS. 2A and 2B. In some embodiments, the length of each path segment can be a function of the beat frequency (or fraction of a beat frequency).

FIG. 5A depicts the operation of the exemplary path gesture at a first point in time corresponding to the beginning of the path gesture. At this time, the current position cue 506 is still at the beginning of path cue 504, and in particular is near the beginning of path segment 504*a*. Accordingly, the player's hand 508 begins tracing out the pattern indicated by path cue 504, and travel in the direction and path indicated by path cue 504*a*. In some embodiments, there may be a preparation period before the current position cue 506 begins moving, in which the player can be alerted to the fact that a path gesture is coming, and can prepare accordingly. Once the current position cue 506 begins moving, the player can begin moving his or her hand. Alternatively, this first point in time can be thought of as the beginning of a preparation period for later path segments, such as path segment 504*d* and 504*i*, discussed in relation to FIGS. 5B and 5C below (as noted above, the preparation period can also begin at other times).

FIG. 5B depicts the operation of the path gesture at a second point in time corresponding to the middle of the path gesture. At this point in time, the current position cue 506 is approximately halfway through the course prescribed by path cue 504, and in particular is near the end of path segment 504*d*. Accordingly, the player's hand 508 is halfway through tracing out the pattern indicated by path cue 504, and is traveling in the direction indicated by path cue 504*d*.

FIG. 5C depicts the operation of the path gesture at a third point in time corresponding to the end of the path gesture. At this point in time, the current position cue 506 is at the end of the course prescribed by path cue 504, and in particular is near the end of path segment 504*i*. Accordingly, the player's hand 508 is nearly finished tracing out the pattern indicated by path cue 504, and is traveling in the direction indicated by path cue 504*i*.

In one embodiment, the progress of current position cue 506 through the path cue 504 is timed to coincide with the musical score being played by speakers 116. For example, each path segment 504*a*, 504*b*, 504*c* . . . 504*i* can correspond to one musical beat or fraction of a beat, such that the player 102 must complete one path segment for each beat or fraction of a beat.

While FIGS. 5A, 5B and 5C depict the player's hand 508 with the pointer finger extended, the game does not require this, nor does it require any particular positioning of the player's fingers. The game can be configured to track, for instance, the location of the player's hand as a unit, or the location of the player's wrist. Furthermore, while FIGS. 5A, 5B, 5C and 5D are directed at measuring gestures completed by a player 102's hand, it is to be understood that the game can measure gestures that are completed by other parts of the player's body, for instance, the player's head, elbows, shoulders, knees or feet. Also, while FIGS. 5A, 5B and 5C depict the current position cue 506 as a star-shaped object, it is to be understood that the current position cue can take on any shape or appearance, such as a circle, a square, or a diffuse spot of light or color.

Figure 5D:
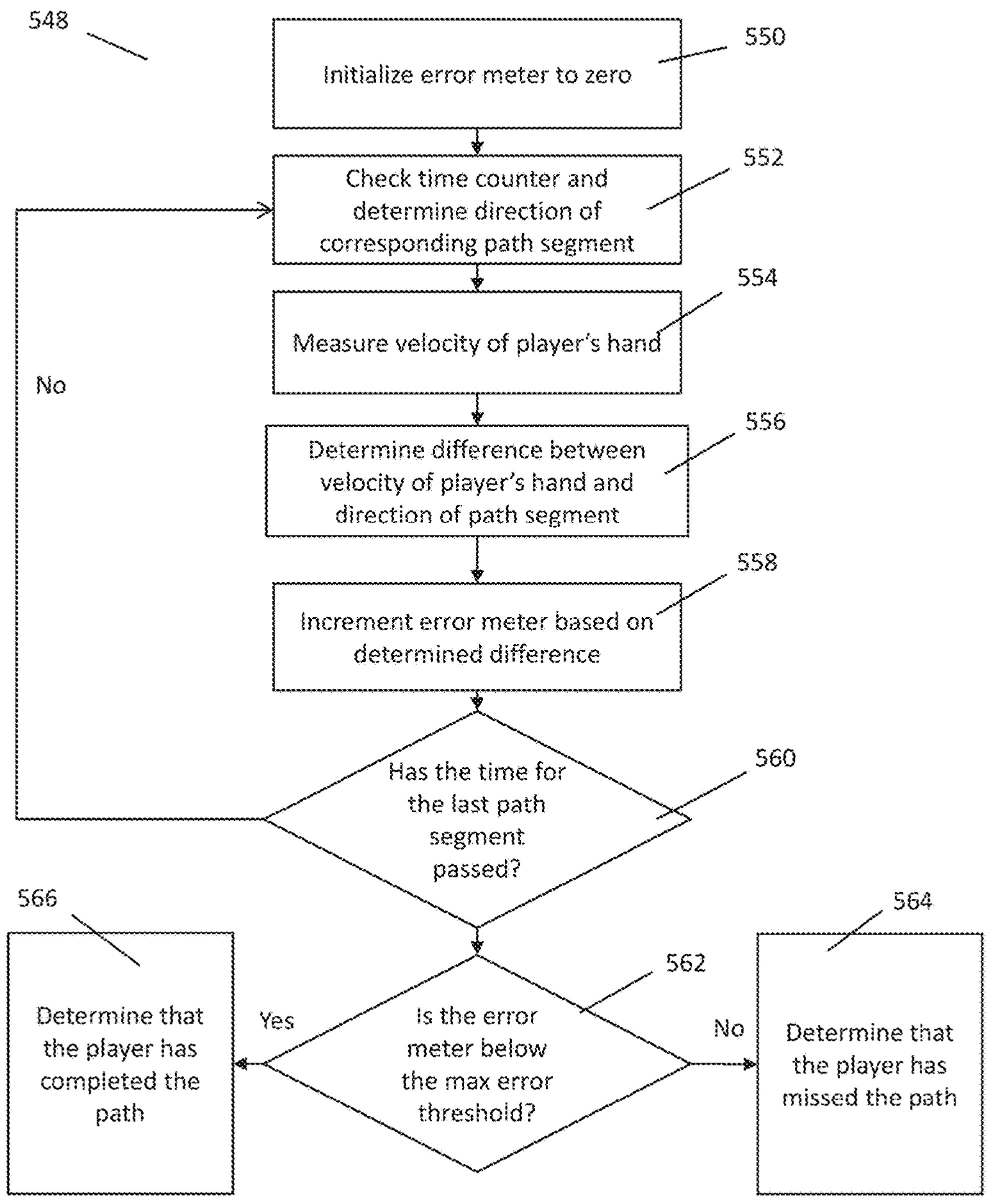
FIG. 5D is a flowchart depicting exemplary steps to determine whether a player has completed a path gesture.

In operation, referring to FIG. 5D, with further reference to FIGS. 1, 5A, 5B, and 5C, a process 548 that can be used to determine whether the player 102 has successfully completed a path gesture, using the system 100, includes the stages shown. The process 548, however, is exemplary and not limiting. The process 548 can be altered, e.g., by having stages added, altered, removed or rearranged. In some embodiments, the process 548 is implemented by a processor that is part of the game console 104 and/or camera 106.

At stage 550, the process 548 can set a cumulative error meter to zero. This error meter can be a software variable kept track of by game console 104.

At stage 552, the process 548 can check a time counter. This can be provided by a timer or clock in the game console 104. The time can also be measured using a beat clock, such that time is indexed using a current beat or fraction of a beat instead of real time (e.g., seconds or milliseconds). Indexing time using a beat clock can differ from indexing using real time because the beat block can be variable through the duration of a song. Depending on the time counter, the process 548 can identify which path segment (e.g., 504*a*, 504*b*, 504*c*, etc.) corresponds to the current time, and determines the direction that corresponds to this identified path segment.

At stage 554, the process 548 can check the velocity of the player's hand 508 (or other body part, such as the player's head, left or right elbow, shoulder, knee or foot). The velocity that the process 548 checks can include a subset of component velocities related to the player's hand 508 (or other body part), e.g., in the X, Y, or Z direction. In some embodiments, the game can be configured to check the velocity of both of the player's hands in stage 554, perhaps by using some of the procedure discussed above in relation to FIG. 2 and stage 254.

At stage 556, the process 548 can determine the difference between the velocity of the player's hand 508 (e.g., the direction in which the player's hand is moving) and the direction which corresponds to the current identified path segment to output an instantaneous error score. To compute this instantaneous error score, the game can measure the angle between the line defined by the motion of the player's hand 508 and the line defined by the corresponding path segment. And/or, the game can compute the cosine of said angle, the square of the cosine of said angle, the sine of said angle, the square of the sine of said angle, and/or some other mathematical function of said angle to output the instantaneous error score. In the embodiments where the process 548 checks the velocity of both of the player's hands in stage 554, the process 548 can be configured to determine which hand to track for the purposes of determining whether the player has completed the path gesture. For example, if the player's right hand is moving in the direction indicated by the currently identified path segment, but the player's left hand is not moving in the indicated direction, the process 548 can track the player's right hand. In other embodiments, the process 548 can also be configured to continue focusing on only one hand for the duration of one path gesture after making an initial determination to follow that hand.

At stage 558, the process 548 can increment the cumulative error meter based on the instantaneous error score determined in stage 556.

At stage 560, the game checks whether the time for the last path segment has passed. If yes, the process 548 can branch to stage 562; otherwise, the process 548 can branch to stage 552.

At stage 562, the game can check the value in the cumulative error meter. If the cumulative error meter is below a max error threshold, the game can branch to stage 566. Otherwise, the game can branch to stage 564.

At stage 564, the process 548 can indicate that the player has failed to complete the path gesture.

At stage 566, the process 548 can indicate that the player has successfully completed the path gesture.

In some embodiments, a path segment can be sufficiently long that the process 548 can be configured to check the movement of the player's hand more than once during the same path segment. In other words, the process 548 can be configured to repeat stages 552, 554, 556 and 558 multiple times for the same path segment. Also in some embodiments, the player can succeed or fail at individual segments of the path gesture, not only the whole path.

Now, turning to the music played by the game, at certain points in the game, the musical soundtrack played by speakers 116 can branch into one of several alternate paths. In some embodiments, the soundtrack played by the speakers can be a mix of several soundtracks, in which the soundtracks can be pieces of instrumentation, such as percussion section, string section, guitar, vocals, and keyboard. Branching into different alternate paths can include muting and unmuting selected soundtracks. These alternate paths can feature substantially the same melody as each other, but can be differentiated from each other in that they can be played in different styles, for example, rock, classical, or jazz. The alternate paths can also feature solo performances by different types of instruments, for example: an electric guitar, piano, or trumpet. The choice gesture is a feature of the game by which a player 102 can select, through a push gesture and a swipe gesture, which of these alternate paths to branch to.

The instruments do not have to be melody-type instruments. For example, bass and drums are not typically considered melody instruments. The alternate tracks can play the same musical role as one another, but in different styles and/or different orchestrations (e.g., vocal section, percussion section, melody section, bass section). Some gestures allow a player to pick a genre for all of the instruments. Other gestures let a player pick different instruments and styles from one another for a single "track" or musical role (e.g., a player can pick a piano, synthesizer, or harpsichord, each playing its own style). In other words, the choice by the player does not necessarily only change the instrument, but can also change what music is played and/or its style. The choice by the player can also change the cues for the subsequent sections to match the new musical track (e.g., cue authoring can change along with the music).

Figure 6:
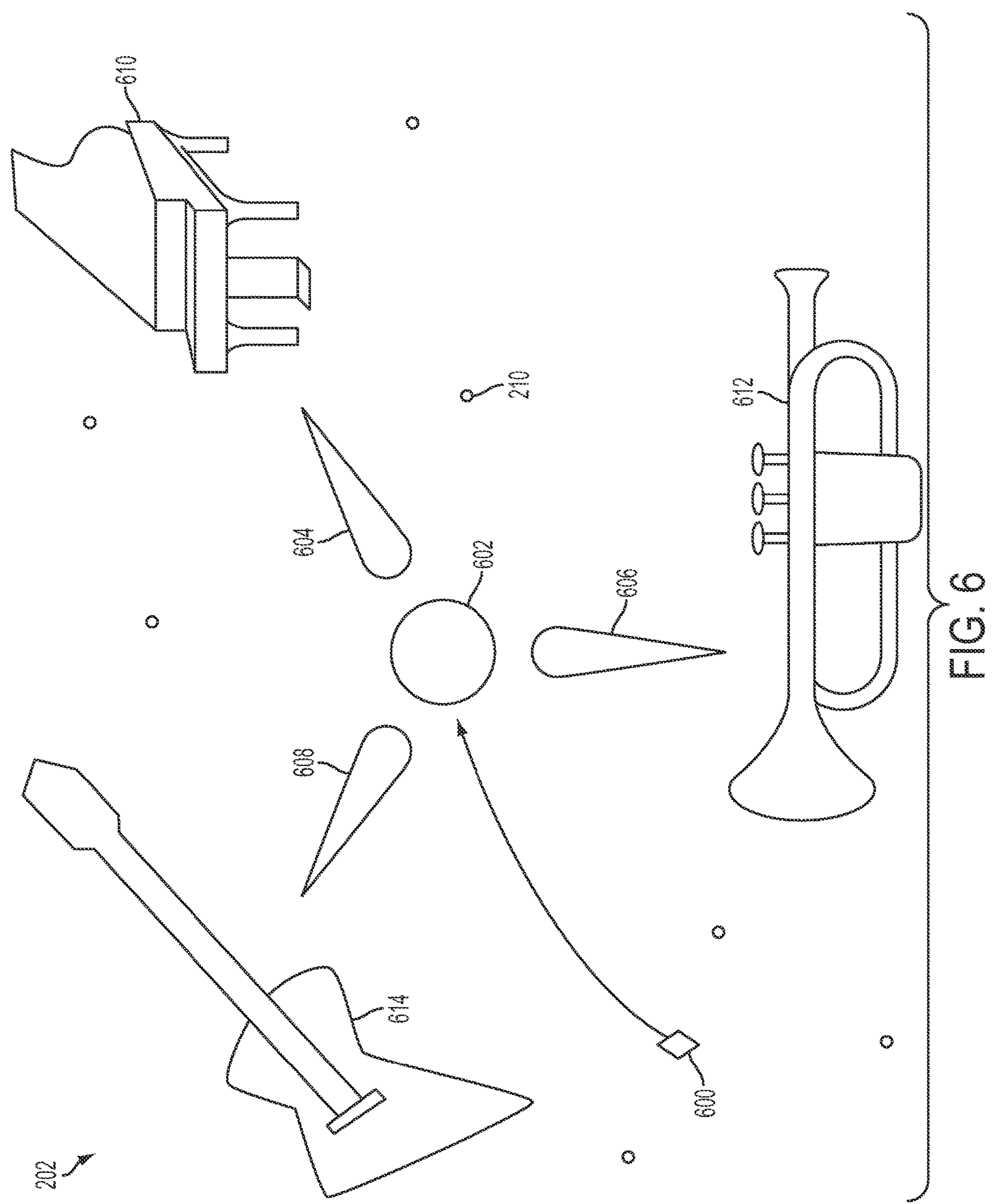
FIG. 6 depicts an exemplary operation of a choice feature.

FIG. 6 is a diagram illustrating an exemplary choice gesture. Different aspects of FIG. 6 can be changed. In this exemplary embodiment, FIG. 6 includes a game space 202, which can include one or more of a dart 600, a push cue 602, swipe cues 604, 606 and 608, and three instruments 610, 612, and 614. In this instance, swipe cue 604 is directed to the upper right of the game space 202 and in the direction of the piano 610; swipe cue 606 is directed to the bottom of the game space 202 and in the direction of trumpet 612; and swipe cue 608 is directed to the upper left of the game space 202 and in the direction of electric guitar 614. FIG. 6 also includes particles 210, which operate in the same way as described above in relation to FIGS. 2A and 2B.

As discussed in relation to push gestures above, the dart 600 can be traveling towards the push cue 602 at a first point in time. When the dart 600 contacts the push cue 602 at a second point in time, the player can be prompted to perform the push gesture. Immediately after performing the push gesture, the player can be prompted to choose which of the swipe gestures to perform. If the player follows swipe cue 604, the game can branch to the path associated with piano 610. Similarly, if the player follows swipe cue 606, the game can branch to the path associated with trumpet 612. Finally, if the player follows swipe cue 614, the game can branch to the path associated with electric guitar 614. In some embodiments the push gesture can be omitted and the player can simply swipe in the chosen direction.

Although a piano, trumpet and electric guitar were selected for this example, the choice of these three instruments was arbitrary and any instrument can be substituted in place of instruments 610, 612, and 614 (e.g., a set of drums, violin, or clarinet). Furthermore, associating a representation of a particular instrument with a particular musical path does not necessarily signify that the path features a prominent solo by that instrument, but can instead signify that the path is played in a musical style commonly associated with that instrument. For example, the path associated with the electric guitar may not feature a solo by an electric guitar, but can be played in a hard rock style. Similarly, the path associated with a violin may not feature a solo by a violin, but can be played in a classical or orchestral style.

At certain points in the game, the player 102 can have an opportunity to score bonus points, or unlock other features of the game, or otherwise change an aspect of the gameplay by participating in a special feature. For example, the feature can be a "mini-game" that is presented to the player 102 at certain points or stages in the game in response to, for example, a user gesture, timing, and/or an accomplishment. One example of a feature is described in connection with FIGS. 7A and 7B.

Figure 7A:
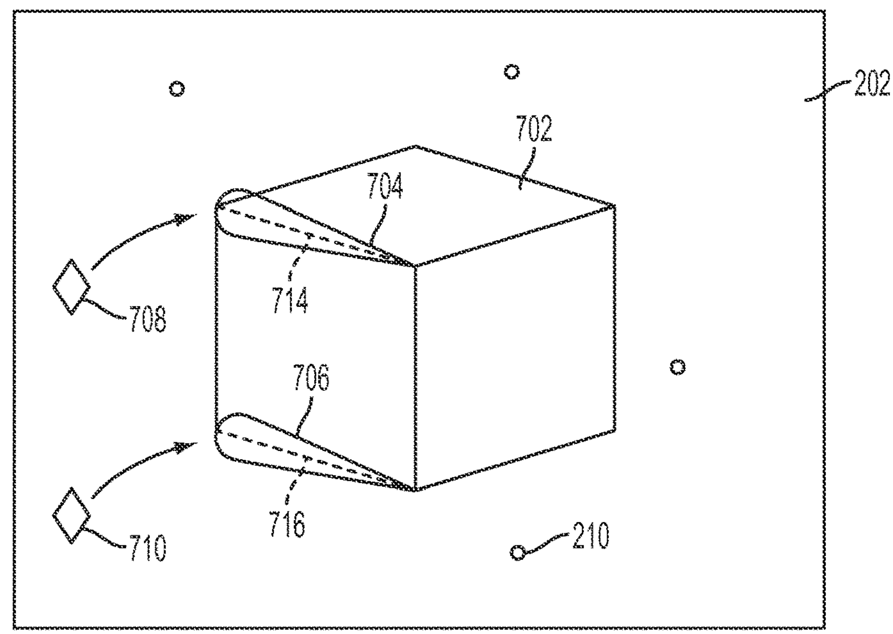
FIGS. 7A and 7B depicts an exemplary polyhedron feature at different points in time.
Figure 7B:
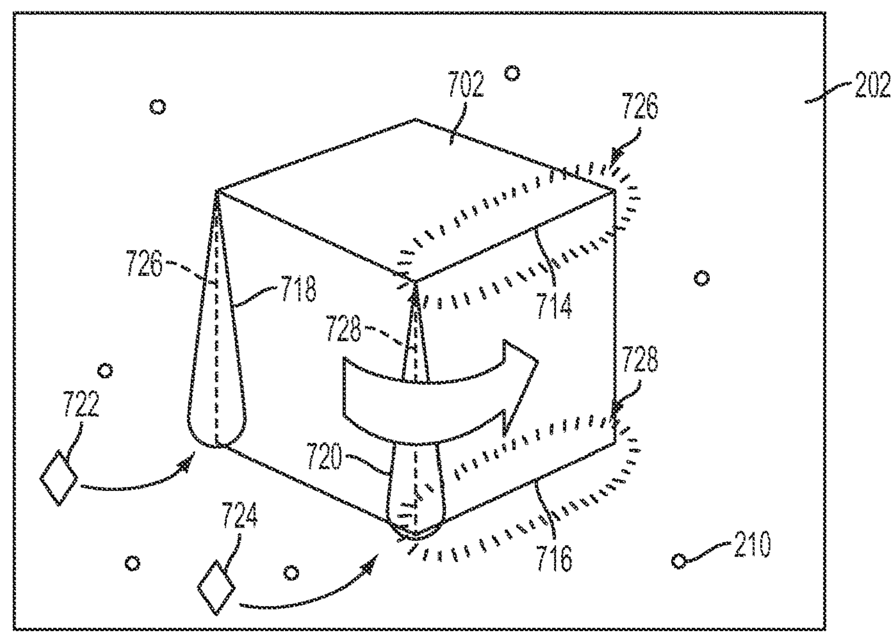

FIGS. 7A and 7B are diagrams illustrating an exemplary operation of a feature of the game in which a player tries to capture all of the edges in the polyhedron. Different aspects of FIGS. 7A and 7B can be changed. In this exemplary embodiment, FIG. 7A illustrates an example polyhedron at a first point in time before any of its edges have been captured. FIG. 7A includes a game space 202, which includes a polyhedron 702 (in this case, represented as a cube), a first swipe cue 704 aligned with one edge 714 of the polyhedron 702, a first dart 708 associated with the first swipe cue 704, a second swipe cue 706 aligned with another edge 716 of the polyhedron 702, and a second dart 710 associated with the second swipe cue 706. While a cube 702 was selected for this example, the choice of a cube was arbitrary and any polyhedron can be substituted in place of cube 702 (e.g., a triangular prism). FIGS. 7A and 7B also includes particles 210, which operate in the same way as described above in relation to FIGS. 2A and 2B.

In order to "capture" an edge of the polyhedron 702, the player 102 can complete the swipe gesture associated with that edge. In this instance, in order to "capture" the edges 714 and 716, the player can complete the swipe gestures associated with swipe cues 704 and 706 respectively. The player can complete both swipe cues 704 and 706 by moving both of his hands in the appropriate direction at the same time.

FIG. 7B illustrates the appearance of polyhedron 702 at a second point in time, in which the polyhedron 702 is rotated to the right (relative to FIG. 7A) to expose new edges for the player to capture. If the player 102 had successfully captured edges 714 and 716, those edges can be changed in appearance as depicted by halos 726 and 728 respectively. For example, edges 714 and 716 can change color, size, or brightness, or be overlaid with other visual effects to indicate that they have been successfully captured. If, on the other hand, the player 102 had not successfully captured one or both of edges 714 and 716 after the first point in time, those edges which were not captured could appear as they did in FIG. 7A.

After the second point in time, new swipe cues 718 and 720 can appear, as well as their associated darts, 722 and 724. As before, swipe cue 718 is associated with one edge of the polyhedron 702, in this case, edge 726, while swipe cue 720 is associated with another edge, in this case, edge 728. Once again, the player 102 can capture edges 726 and 728 by successfully completing the swipe gestures associated with swipe cues 718 and 720 respectively. The player can complete both swipe cues 718 and 720 by moving both of his hands in the appropriate direction at the same time.

The polyhedron 702 can continue rotating in different directions, e.g., right, left, up or down, at successive points in time until the player 102 has had at least one opportunity to capture all the edges. If the player 102 successfully captures all the edges of the polyhedron 702, the game can change at least one aspect of its gameplay, for example, unlocking special bonus new features, giving player 102 bonus points, or displaying special visual effects.

While the operation of the game has been described in the context of one-player operation, the game can also be played in two-player mode, in which two players play the game simultaneously. This can be accomplished by having both players stand side by side in front of the Kinect sensor 106 such that both players are within the Kinect sensor 106's field of view.

Figure 8A:
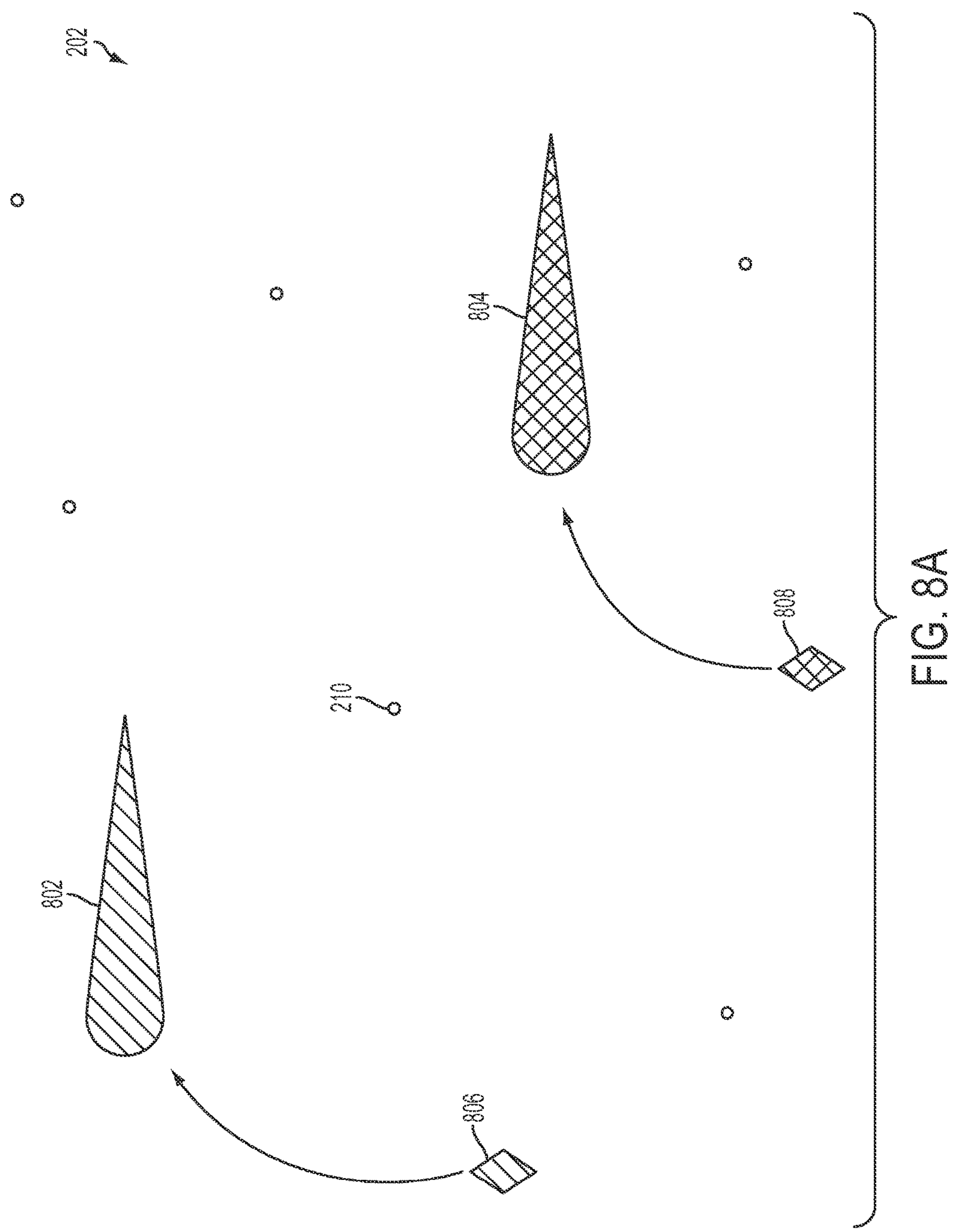
FIG. 8A depicts an exemplary operation of a two-player mode.

FIG. 8A is a diagram depicting a game space 202 during two-player operation. Different aspects of FIG. 8A can be changed. In this exemplary embodiment, FIG. 8A includes a first swipe cue 802, a first dart 806 associated with the first swipe cue 802, a second swipe cue 804, and a second dart 808 associated with the second swipe cue 804. FIG. 8A also includes particles 210, which operate in the same way as described above in relation to FIGS. 2A and 2B. The first swipe cue 802 and the first dart 806 are colored in a first color, while the second swipe cue 804 and second dart 808 are colored in a second color, as indicated by the different cross-hatching. Alternatively, the first and the second cues can be differentiated using different textures, materials, or some other aspect of their appearance. The game can differentiate between multiple players using information that can be provided by the camera system 106. While the examples in FIG. 8A are discussed in the context of a swipe cue, other cues can also be used during two-player operation.

In two-player mode, the two players can complete both swipe cues. In one embodiment of the game, the player on the left completes the swipe cue on the left, i.e., swipe cue 802, while the player on the right completes the swipe cue on the right, i.e., swipe cue 804. In another embodiment of the game, the player on the left completes the swipe cue in the first color, while the player on the right completes the swipe cue in the second color, regardless of where in the game space 202 the swipe cues appear. In these two embodiments, the game can be configured to keep track of which player is assigned to which cue, and to keep track of each player's individual score, which is based on each player's individual performance with respect to completing his assigned cues, as well as a group score which reflects both player's performance as a team.

In another embodiment, the first color and the second color are the same color, and it does not matter which player completes which swipe cue, as long as both cues are completed. The game can require that one cue be completed by one player while the other cue is completed by the other player. In yet another embodiment, both cues can be completed by either player. In these last two embodiments, the game can be configured to keep track of a group score which reflects both player's performance as a team rather than in individual scores. There may also be cues that need to be completed by both players. If not, either no player gets a score, or no group bonus is given.

Figure 8B:
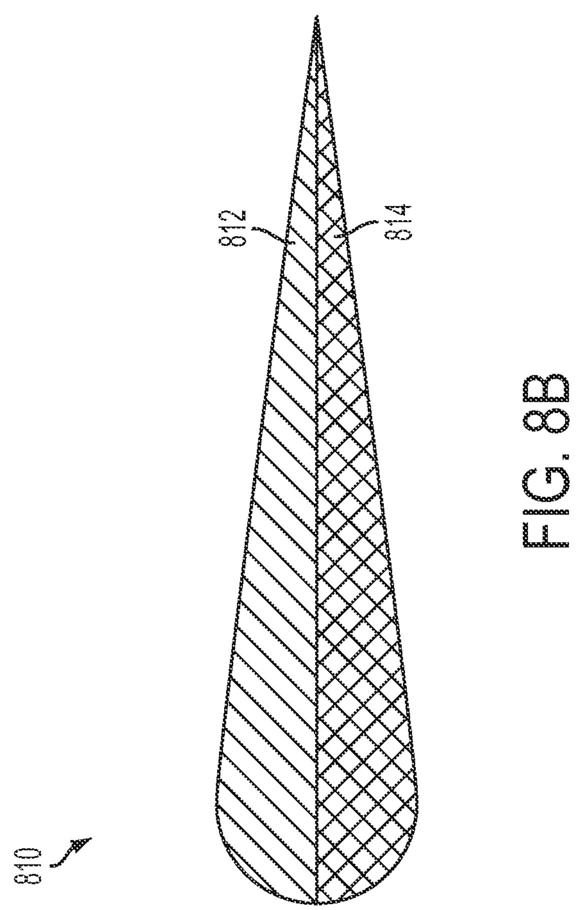
FIG. 8B depicts an exemplary cue that can be used in two-player embodiments.

FIG. 8B illustrates another example of a swipe cue 810 that comprises a first half 812 that is a first color, and a second half 814 that is a second color. In some embodiments, swipe cue 810 can appear to indicate that the cue can be completed by either player. Different aspects of FIG. 8B can be changed, including the type of cue, the appearance of a cue, the division of the colors, or the number of colors (e.g., instead of appearing as two different colors, the cue can appear as a third color that corresponds to neither the first nor the second player, but instead indicates that either player can complete the cue).

While FIGS. 8A and 8B and the above description are directed at illustrating two player operation using swipe cues, the choice of swipe cues is arbitrary; the game can also employ push cues, sustain cues, path cues, choice cues, or polyhedron-capture cues in two player mode.

Turning to another aspect of the disclosed subject matter, the game system can include an on-screen cursor system that can allow a player to interact with two- or three-dimensional virtual worlds. In some embodiments, the two- or three-dimensional virtual world can contain a protagonist character whose actions are influenced by the player's movements. In other embodiments, the two- or three-dimensional virtual world will not contain a protagonist character. In either of the preceding embodiments, the two- or three-dimensional virtual world can contain a cursor in addition to or in place of the protagonist. The cursor is typically a player-controlled virtual object that can move around in the virtual world in two- or three-dimensions. The cursor system can take various forms including, for example: a one-element cursor and/or a "two-element" cursor.

In some embodiments, the cursor's location in the virtual world can be independent of the view of the world. For example, "looking around" in the virtual world by changing the view can be controlled independently from the cursor. In other words, the cursor does not have to control the view the player sees and the cursor can move independently of the field of view of the virtual world. As a further example, the player can pan left/right in the virtual world by stepping left/right in front of camera 106. In embodiments with a protagonist, based on the player moving left/right or forward/backward, the protagonist can look to the left or right or forward or backward, rotate the view, and/or can move his or her body in the virtual world. If the player lowers his or her body in front of the sensor system, the protagonist can also lower its body. The system can also be configured to detect crawling when the player's body rests on or close to the ground. The system can be made such that the protagonist jumps when the system detects the player jumping. If the player walks in place, the protagonist can walk forward in the virtual world. The speed of the protagonist's movement can depend on how fast the player "walks." Alternatively or additionally, based on the player moving left/right or forward/backward, the virtual camera that determines the viewpoint in the virtual world can pan, truck, dolly, or move on another path.

Figure 9A:
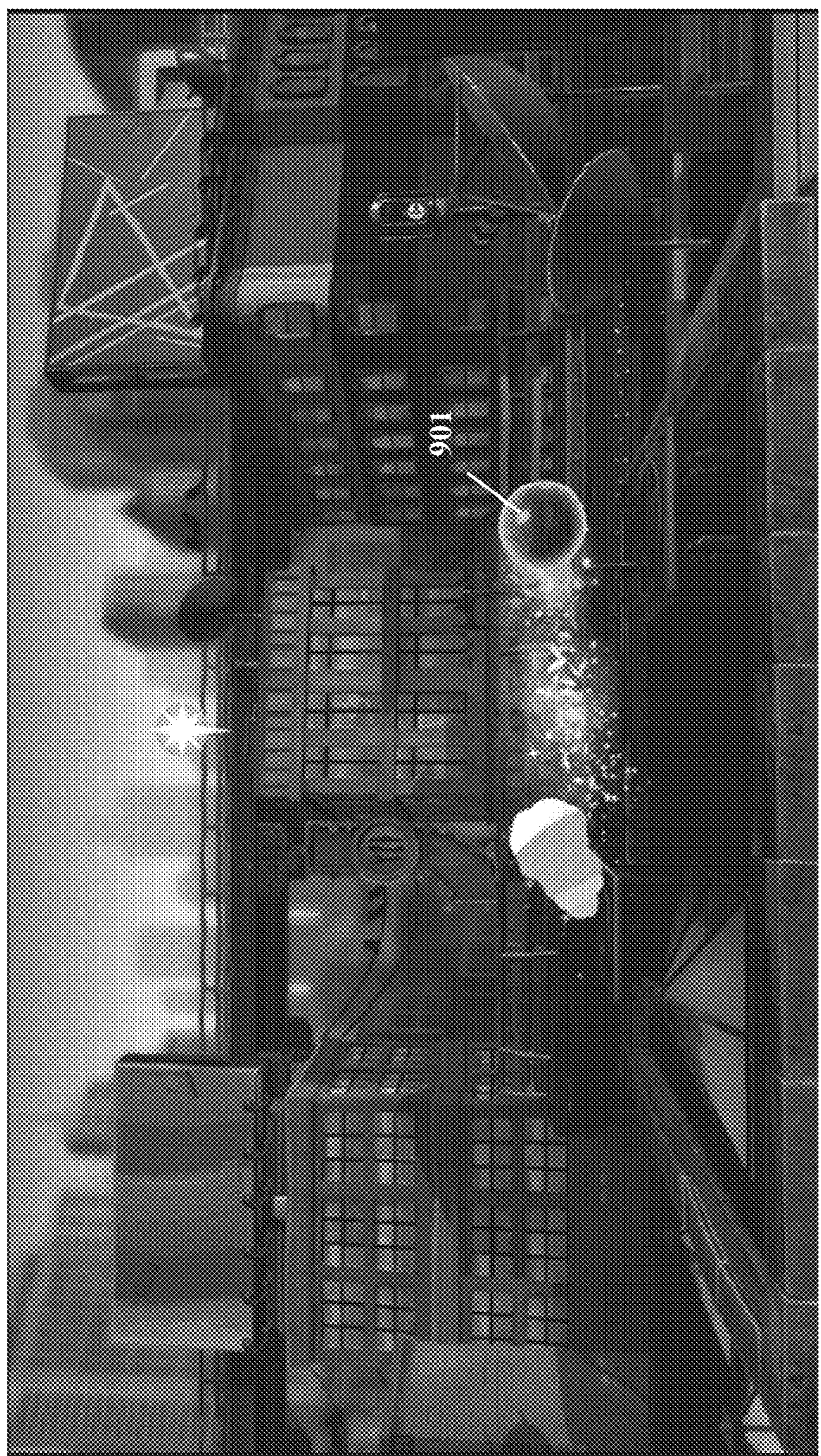
FIGS. 9A and 9B are exemplary screen shots of aspects of some embodiments.
Figure 9B:
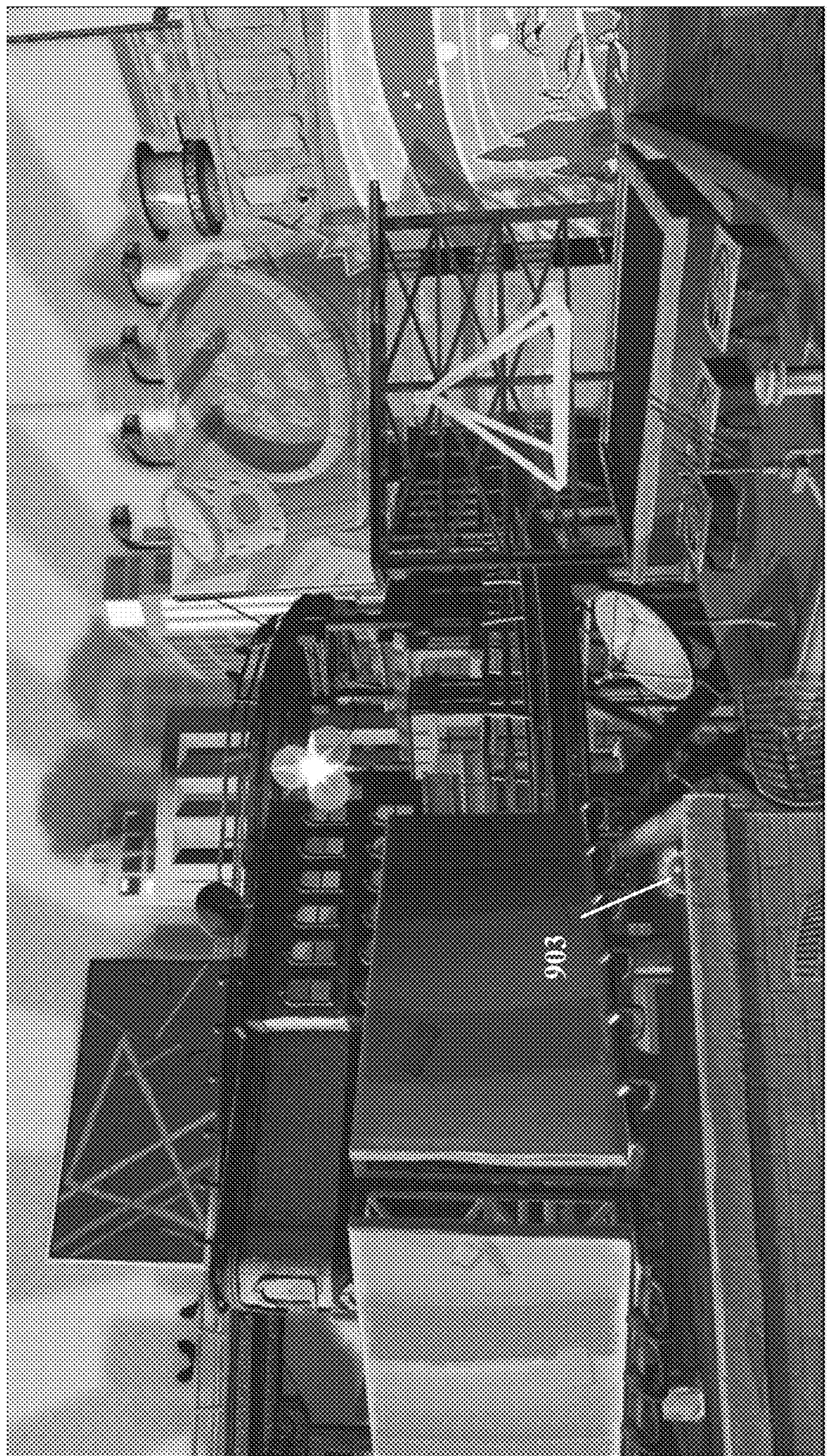

FIG. 9A shows an exemplary one-element cursor 901 in an exemplary virtual world. Various aspects of this one-element cursor can be changed, such as its size, its appearance, and its behavior. FIG. 9B shows an exemplary one-element cursor 903 that is partially obscured by an object in the virtual world. As can be seen, the part of the one-element cursor 903 that is obscured can still appear as a faint outline to show its position (though this isn't required). Again, various aspects of this one-element cursor can be changed, including the whether and how portions of the cursor that are obscured by objects appear.

For the one-element cursor, the screen can display a cursor that moves around the field of view based on the position of, for example, one of the player's hands, as detected by camera 106 (e.g., as shown in FIGS. 9A and 9B). For example, the game system can track the position of the player's hand in the field of view of camera 106 along the X/Y direction and move the cursor's location in an X/Y direction in the virtual world on the screen. In some embodiments with a three-dimensional virtual world, the cursor can also move the in Z-direction of the virtual world by tracking the Z position of the player's hand. The X/Y/Z direction in each of the real world and the virtual world can be, but are not limited to being, orthogonal to each other. In some embodiments, any of the X/Y/Z directions can be reversed from the corresponding X/Y/Z directions in the real world.

As the one-element cursor moves around the virtual world, it can interact with virtual objects. Various techniques are possible to determine when and how the one-element cursor interacts with objects in the virtual world. For example:

- If the one-element cursor is within a predefined distance of an object, the cursor can interact with the object.
- If the one-element cursor is within a predefined distance of an object for a predetermined amount of time, it can interact with the object.
- If the one-element cursor is within a predefined distance of an object, and the player performs another action and/or gesture (e.g., raising their other hand), the object can interact with the object.
- The player can trigger a special action relating to an object by performing a "table flip" gesture. This gesture typically requires the player to begin with their hands at waist-level. Then, the player quickly lifts both hands upward simultaneously to trigger the special action.

In the foregoing examples, "within a predefined distance" can be determined using some or all of the three axes. For example, in a three-dimensional virtual world, the one-element cursor can interact with an object if it merely aligns with an object in the X/Y (but not Z) direction. In some embodiments, the nature of the interaction can be different depending on how it is triggered. For example, if the cursor is close to the object it can interact one way, and if it stays close for a certain period of time (perhaps without moving significantly), it can interact in a different way. An interaction can refer to any change in the object, for example, causing the virtual object to open, close, grow, shrink, move in some way, emit sounds, or otherwise change its appearance and behavior.

The game system can determine a Z-position of the one-element cursor using various techniques. For example, the Z-position of the one-element cursor can be determined by the Z-position of the player's hand, as determined by a depth image provided by camera 106. The Z-position of the cursor can also be controlled as a function of another of the player's joints (e.g., if the player is controlling the cursor with their right hand, Z-position can be controlled by moving their left hand up and down). The Z-position can also be controlled as a function of the player's body position (e.g., as the player moves closer to the camera system, the cursor can move proportionality in the virtual world). The Z-position of the cursor can be determined as a function of the Z-position of other nearby (in the X-Y direction) objects in the virtual world.

Typically, the cursor is controlled by following a single hand (e.g., the left or right), but there can be anomalies if a player brings their other hand up and then puts the original hand down. To handle this smoothly, the game can use a weighted position between the player's left and right hands. For example, the game can allow the player to raise both hands and have the cursor at a weighted position between the hands, depending on which hand is closer, etc. If both hands are raised, the cursor would be somewhere in the middle of the player's two hands.

The game can also use "cursor holders," which can be visually indicated as white semi-circles that face in the direction of the hand they belong to (e.g., a right-oriented semi-circle can indicate the player's right hand). The purpose of the cursor holders can be to show the player where the game thinks their hand is. The cursor holders can follow the same logic as the cursor for mapping the player's physical hand position to the virtual space. That is, the hand frames and the near/far/wall cursor planes (described below) can all affect the cursor holders. These cursor holders can be useful, for example, when the player raises both hands, which can result in the cursor being positioned somewhere in the middle of the player's two hands (as described above), and therefore somewhere in the middle of two cursor holders. By displaying the cursor between two cursor holders, the player can visually see how the movement of both of his hands affects the position of the cursor.

For a two-element cursor, the player can move a primary cursor similar to the one-element cursor. When the primary cursor is near a certain object (e.g., within a predetermined distance of a wheel in the virtual world, either in two- or three-dimensions), the primary cursor's motion can become constrained in some way. For example, it can "stick" to the object or slide alongside the object. In this interaction mode, because the player no longer has full control over the primary cursor, a secondary cursor can appear near the cursor (called the "secondary element") which is still freely controlled by the player's hand or other body parts. This secondary element can be visually connected to the primary cursor, and can appear to pull or push the primary cursor. In this mode, the secondary cursor's motion can now be used to manipulate or change the state of the object that the primary cursor is constrained to. The user can move his hand or other parts of their body to slide or rotate the object in the virtual world. The speed of movement of the object can be determined by the speed of player's body movement.

If the player moves his or her hand sufficiently far away, thus moving the secondary cursor away from the object, then the interaction mode can disengage. Then, the primary cursor can be detached from the object and the secondary cursor can disappear, returning to the one-element cursor mode. Alternatively or additionally, moving the secondary cursor away from the object can cause the primary cursor to detach from the object if the secondary cursor is moved with sufficient speed.

Figure 9C:
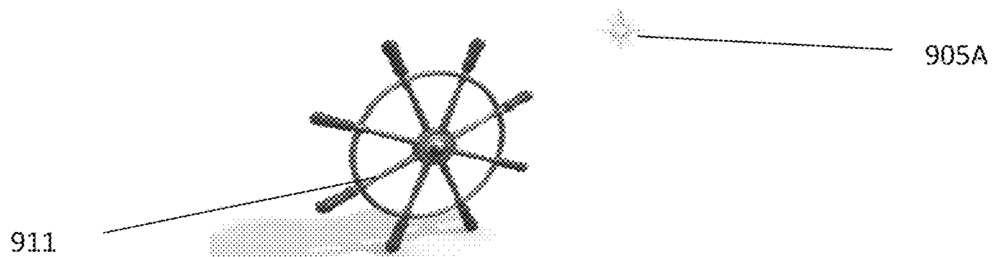
FIGS. 9C, 9D, and 9E depict an exemplary operation of a two-element cursor.
Figure 9D:
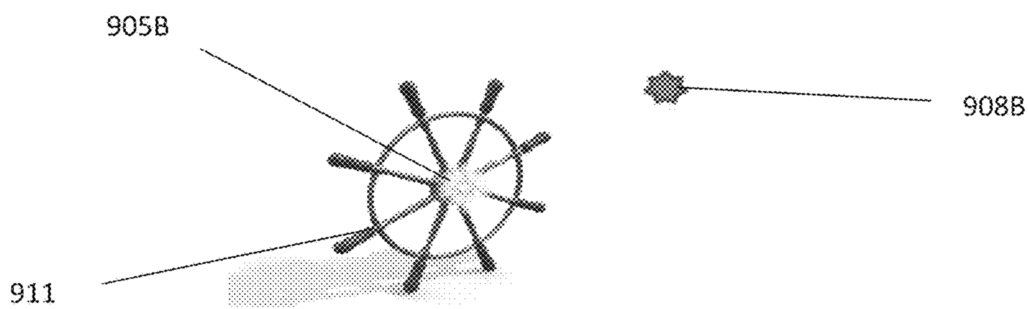
Figure 9E:
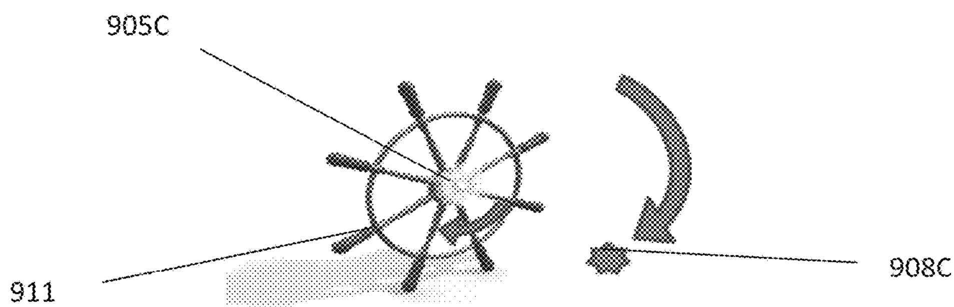

FIGS. 9C-9E illustrate an exemplary embodiment of the two-element cursor. Different aspects of FIGS. 9C-9E can be changed. In this exemplary embodiment, in FIG. 9C, a primary cursor 905A can be moved around freely. When the primary cursor 905A moves within a predetermined distance of a wheel 911, the primary cursor 905A "locks on" to a center of the wheel 911. When the primary cursor 905A is "locked" to the wheel, it can no longer be moved around freely (e.g., it becomes unresponsive to the motion of the player's hand, up until the player's hand moves so far that the primary cursor disengages, as described above). Also, when the primary cursor 905A is "locked" to the wheel, the primary cursor 905A no longer typically interacts with objects other than the wheel in the virtual world.

In FIG. 9D, when the primary cursor is locked onto the wheel 911, a secondary cursor 908B appears. This secondary cursor 908B can take the appearance of a second shape (e.g., a star) that appears a certain distance away from the primary cursor 905A that is locked to the wheel. When the player moves his or her hand in a circular motion around the wheel (e.g., as shown in FIG. 9E), the secondary cursor 908C will rotate around the center of the wheel in a way that mimics the movement of the player's hand. For example, if the player moves his or her hand in a clockwise fashion, the secondary cursor 908C will move clockwise as well. In some embodiments, the game can be configured to move the secondary cursor 908C in a circular motion around the wheel even if the player's hand does not move in a circle (e.g., if the player moves his hand down or to the left, the secondary cursor 908C can be configured to rotate clockwise, but if the player moves his hand up or to the right, the secondary cursor 908C can be configured to rotate counterclockwise). The wheel 911 is configured to spin in the same direction as the movement of the secondary cursor 908C.

In another example, when the player moves the primary cursor within a predetermined distance of a slider object, the primary cursor can become locked onto the slider object such that it can only slide on a single linear axis (thus causing the secondary cursor to appear). The player continues to move his hand around the slider object (thus moving the secondary cursor), but the primary cursor itself is constrained to move only along the slider axis. In this way, the player can move the slider object back and forth, by "pulling" the cursor along the slider, even if the secondary cursor is not moving parallel to a slider axis.

An object to which the primary cursor locks can be moved or rotated in all three dimensions. In this case, the player can slide an object in 1-D (e.g., like a light switch) or rotate an object in 2- or 3-D based on his or her movements.

In some embodiments, the two-element cursor can be implemented as described in the following non-limiting example.

The cursor can be treated as a virtual "cage" to which a virtual "core" is attached. Doing so can, for example, smooth the movement of the virtual cursor and make its movement more appealing to the player. While the cage follows the position of the player's hand, the virtual core can be configured to be tethered to the cage using a virtual elastic tether. That is, the core can be programmed to move around in the virtual space as if it was a mass with inertia that is attracted to the cage. In some embodiments, the core can be visible all the time, or most of the time, while the cage can be invisible most of the time (and only turn visible when certain conditions are met, as described in more detail below). The core and cage can follow the player's hand. The core can collide with objects in the virtual world using regular physics (e.g., the core can bounce or hang on objects, and objects can be affected by the core). In this embodiment, the visible core can appear to move more naturally, rather than following the player's hand exactly.

In some embodiments, instead of bouncing off objects, the core can be configured to "stick" to objects after a collision. The core can become stuck to objects using magnetization based on two-dimensional and/or three-dimensional proximity. Alternatively, the core can become stuck to objects if it is held in proximity to an object for a predetermined time period. The core can also be configured to stick to only certain types of objects but not others.

Once the core is stuck, the cage can become visible (if it wasn't before). In some embodiments, the cage can appear as the secondary cursor which can be manipulated by the player's hand (or other body part). As described above, the player can manipulate the secondary cursor or cage in order to change the appearance or some other aspect or property of the object to which the core is stuck. In other embodiments of the two-element cursor, the secondary cursor can be comprised of a second cage/core combination.

When the core is stuck to an object and the player moves his or her hand slightly away from the object, the core can become separated from the cage. In that case, the game can be configured to display particles (e.g., a stream of motes of light or small shapes) that are emitted from the core and are attracted to the cage to indicate the separation. In some embodiments, the cage can be non-visible even if the core is stuck to an object, such that particles emitted from the core are attracted to the virtual position of the player's hand without there being a visual indicator of where the player's hand is. In yet other embodiments, the core need not be stuck to a fixed point in the virtual world but can instead be constrained to move along a predefined path in the virtual world (e.g., a spline). The core can appear to be pulled along this predefined path by the attraction between the virtual location of the player's hand and the core. One example of this is a "mix switch," which can appear as a toggle switch or slider that allows the player to switch between different audio treatments. Since the mix switch can activate only along a single axis, the core can be constrained to move only along that axis, while the cage can move freely with the user's hand.

In one embodiment, the way in which the core moves can be quantized to the beat of the music. For example, when the player moves his hand across the strings of a harp, the core an strum the notes of the harp and appear to "hang up" or pause at each string, playing $8^{th}$ notes. Meanwhile the cage (or invisible cage) can still track the user's hand. This can solve a problem of indicating musical quantization in the UI while still showing the user feedback on their hand position.

In some embodiments, if the player moves his hand such that the cage moves more than a predetermined distance (in two- or three-dimensional space) away from the core, the core can "break away" from the object to which it is stuck.

Figure 10:
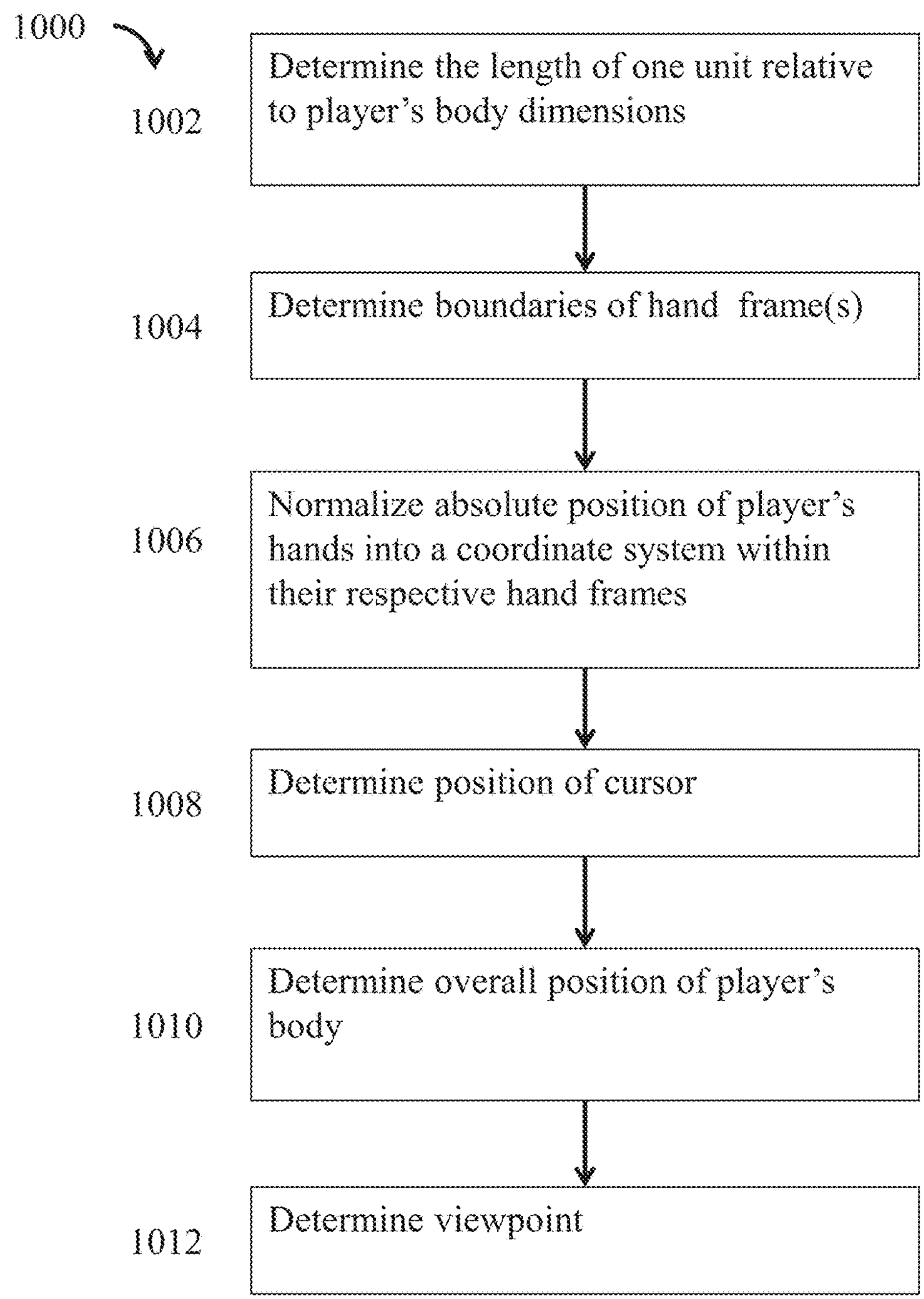
FIG. 10 is a flowchart depicting exemplary steps to determine the position of a cursor.

In operation, referring to FIG. 10, a process 1000 that can be used to map the player's space (e.g., real space) to a three-dimensional virtual space includes the following exemplary steps. Using this process, the game can typically match comfortable player movement to the game space. For example, if a player is using his right hand to control an on-screen cursor, the player's right hand can only move so far to the left and right (e.g., being limited by the configuration of the human skeleton), which may not necessarily match the size of the game space. Thus, in some embodiments, the game can map the left-most possible position of the player's hand to the left-most part of the game space, and the right-most possible position of the player's hand to the right-most part of the game space. This principle can be used in the X, Y, and Z directions.

At stage 1002, the process 1000 can define one "unit" based on the distance between two or more joints in the skeleton provided by camera 106. For example, one unit can be defined to be the distance between the player's head and the player's hip. This unit distance can be used for further computations, as described below. In other embodiments, different computations can use a different set of joints for measurement—some of these alternative embodiments are discussed in further detail with regard to specific computations below. By defining one unit in a way that is relative to a player's body dimensions, the process 1000 can be configured to function for people of different sizes.

At stage 1004, the process 1000 can determine the position and size of a hand frame. A hand frame can include a region defined by a plurality of coordinates, either in two dimensions or in three dimensions, which encompasses an expected range of motion of a player's hand. In some embodiments, the process 1000 can determine the position and size of two hand frames: one for each of the player's hands. For example, a left hand frame can be a fixed number of units high (e.g., 1 unit), and a fixed number of units wide (e.g., 1 unit).

Figure 11:
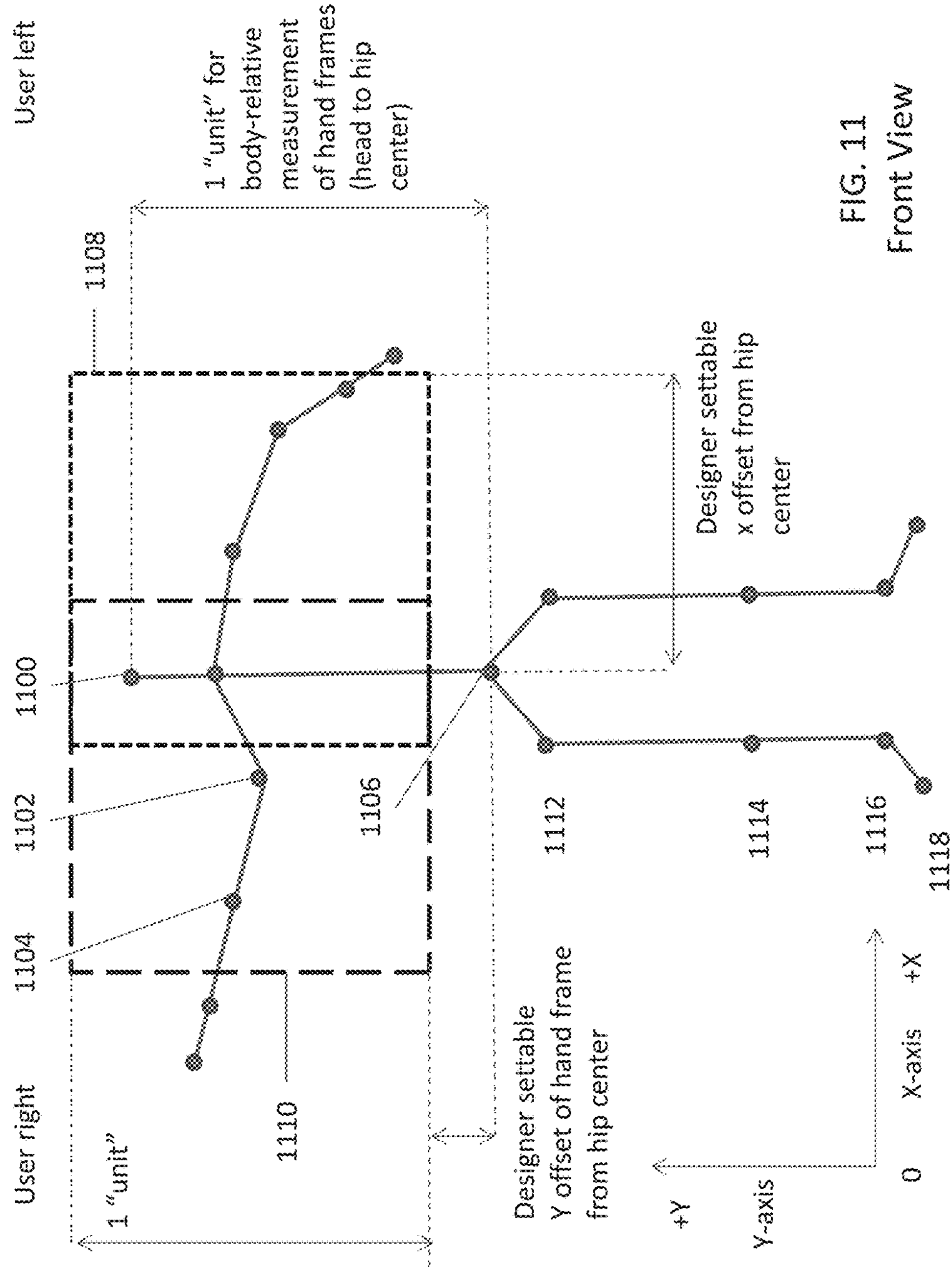
FIG. 11 depicts a front view of an exemplary left and a right hand frame.

FIG. 11 illustrates an example of a left and a right hand frame as viewed by camera 106. FIG. 11 includes a skeleton of the player's body, including head joint 1100, right shoulder joint 1102, right elbow joint 1104, center hip joint 1106, right hip joint 1112, right knee joint 1114, right ankle joint 1116, and right foot joint 1118. FIG. 11 also includes a left hand frame 1108, and a right hand frame 1110. As discussed previously, one unit can be defined as the distance between head joint 1100 and center hip joint 1106 (although distances between other joints in the player's body are also possible). Left hand frame 1108 and right hand frame 1110 can be configured to be one unit wide and one unit high, as illustrated in FIG. 11. Other configurations are possible, often depending in part on characteristics of the video camera. For example, one unit high by 0.8 units wide, or 0.77 units high by 0.62 units wide. The position of the frames 1108 and 1110 can be based on one or more joints in the skeleton from the video camera. For example, as illustrated in FIG. 11, the frames can be positioned based on the position of center hip joint 1106, in which the frames are offset in the X direction by a designer (or user) configurable X-offset, and in the Y direction by a designer (or user) configurable Y-offset. As with width and height, various configurations are possible, often depending in part on characteristics of the video camera. For example X-offset 0.5 and Y-offset 0.15, or X-offset 0.39 and Y-offset negative 0.11. Other ways to position the frames 1108 and 1110 are also possible. For example, right hand frame 1110 can be centered around right shoulder joint 1102, while left hand frame 1108 can be centered around the corresponding left shoulder joint (plus or minus a designer configurable offset in the X or Y direction). In some embodiments, the frames 1108 and 1110 can indicate a zone of comfortable movement for each hand of the player.

Figure 12:
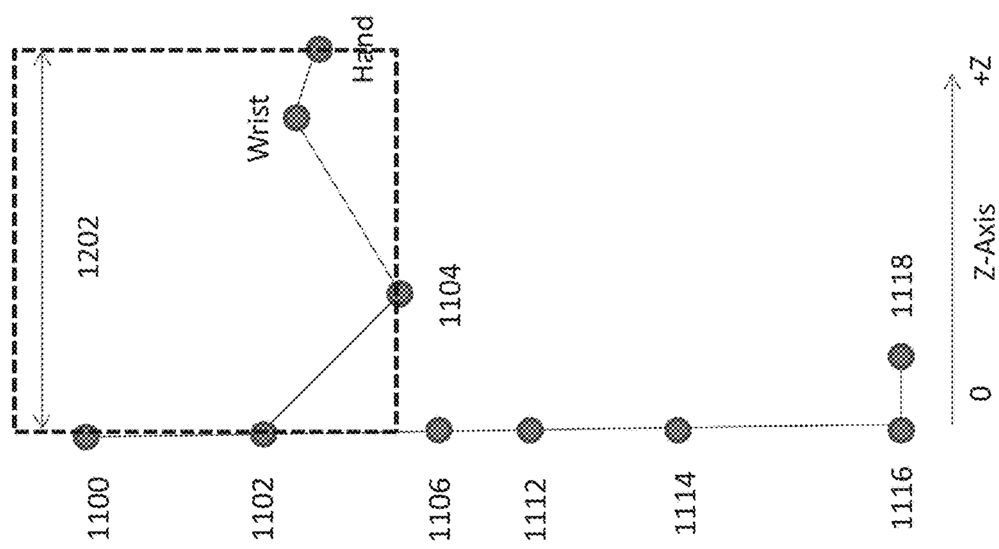
FIG. 12 depicts a profile view of an exemplary hand frame that has been extended into the Z-direction.

FIG. 12 is a profile view of a player that illustrates an exemplary hand frame that has been extended into a third dimension (e.g., the Z-direction). FIG. 12 includes the joints discussed previously in relation to FIG. 11, i.e., head joint 1100, right shoulder joint 1102, right elbow joint 1104, center hip joint 1106, right hip joint 1112, right knee joint 1114, right ankle joint 1116, and right foot joint 1118. The Z-axis can be thought of as beginning at 0 at a position that is flush with the player's body (e.g., in line with center hip joint 1106, or some other joint), and extending to positive Z coordinates towards the camera. The depth of a hand frame 1202 can be a fixed number of body units deep (e.g., 1 unit, 0.75 units). In another example, the depth of the hand frame 1202 can be based on different measurements than the measurements used to determine the width and height of the frame. In other words, where the width and height of the frame can be based on the distance from the player's hip to the player's head, the depth of the hand frame can be based on the distance from the hand to the shoulder, the distance from the hand to the elbow, and/or the distance from the elbow to the shoulder. The left hand frame can also be positioned in the Z-dimension in a way that is based on one or more joints in the skeleton. For example, the left hand frame can be centered around the player's left shoulder (plus or minus a designer configured offset). In another specific embodiment, the left hand frame can start from the player's left shoulder, and extend towards camera 106, as illustrated in FIG. 12.

If multiple measurements of the distances discussed in relation to FIGS. 11 and 12 are taken over time, these measurements can be passed through a low-pass filter to produce a smoothed distance of, for example, the player's hip to the player's head, and, for example, a smoothed set of distances from the player's hand to elbow, elbow to shoulder, or hand to shoulder.

Returning to FIG. 10, at stage 1006, the process 1000 can normalize the absolute position of the player's hand into a coordinate system within that hand's hand frame. For example, the position of the player's hand in the hand frame can be normalized into the range 0 to 1 on either or both the X and Y axes, where 0 is on one end of the range of the hand frame and 1 is on the other end of the range. The Z-position of the player's hand can also be normalized into the range 0 to 1, where 0 is roughly against the body or flush with the player's hip (determined, for example, by setting Z=0 to be the Z-coordinate of the player's hip center joint, or the average of the player's left hip joint and right hip joint), and 1 is roughly with the arm extended towards camera 106. For example, Z-position can be normalized based on a comparison (e.g., ratio) of the distance from the hand or wrist to the shoulder with the sum of the distance from the hand or wrist to the elbow and the distance from the elbow to the shoulder. If the normalized Z value falls outside the 0-to-1 range, the normalized value can be clamped to the 0-to-1 range. In some embodiments, measurements of X, Y, and/or Z can be smoothed over time before or after being normalized or compared with other values.

At stage 1008, the cursor's position in the virtual space can be determined based on the player's hand position. For example, the X and Y position of the cursor can be based on the normalized position of the player's hand in the hand frame. For example, if the normalized position of the player's hand on the X axis is 0, the X position of the cursor can be at the left side of the screen displayed to the user (e.g., a viewport). Similarly, if the normalized position of the player's hand is 1, the X position of the cursor can be at the right side of the screen displayed to the user. A similar mapping system can be used for the Y dimension, where Y=0 corresponds to the bottom of the screen displayed to the user, and Y=1 corresponds to the top of the screen displayed to the user. In embodiments where the virtual space is in three dimensions, and camera 106 is capable of tracking the Z position of the player's hand, the cursor's Z-position in the virtual space can be based on the normalized Z-position of the player's hand, as described above for the X and Y dimensions.

Figure 13:
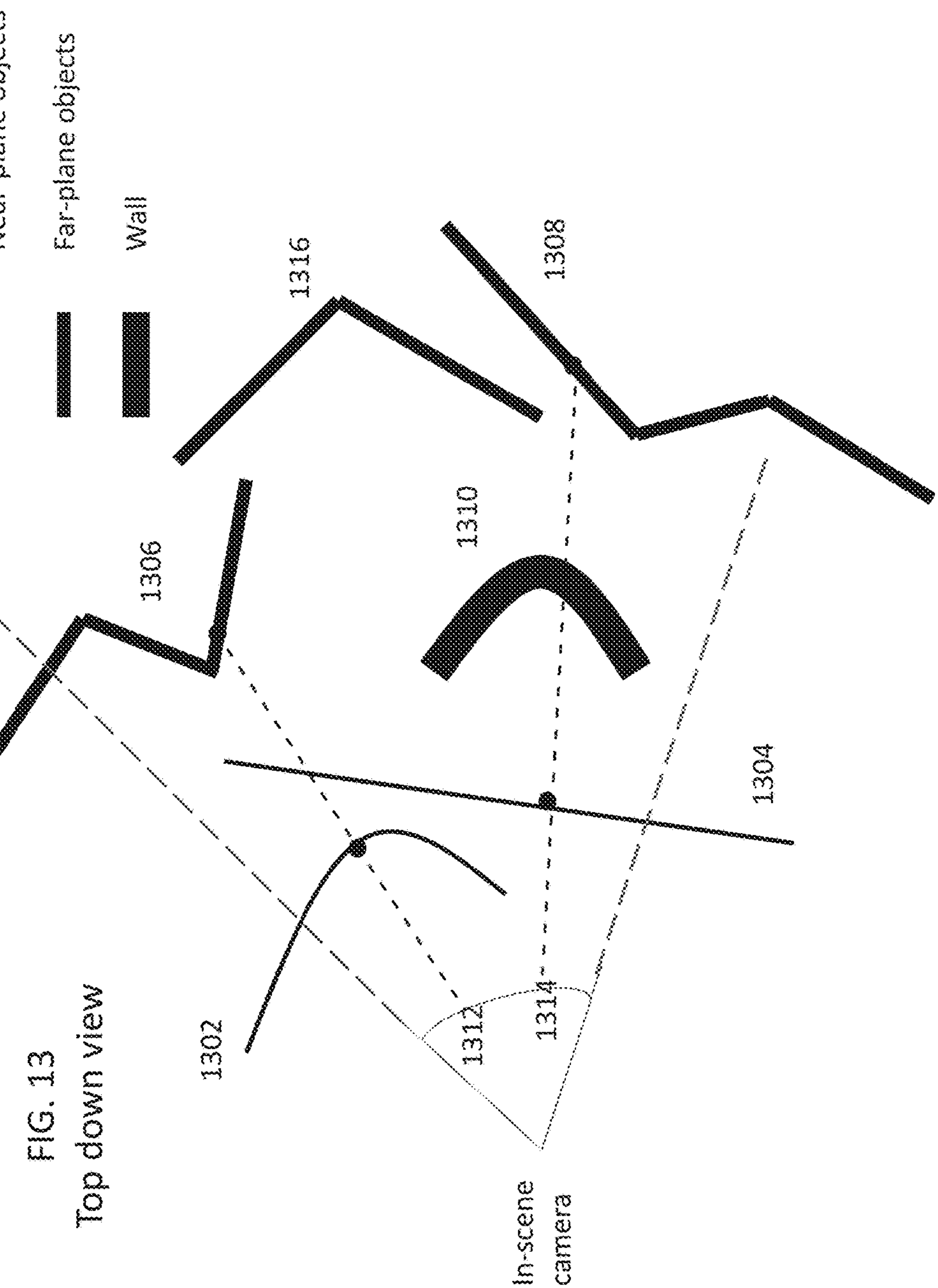
FIG. 13 depicts a top down view of an exemplary virtual space, as viewed by an in-scene camera.

With reference to FIG. 13, the normalized Z-position of the player's hand in real space can be mapped to a Z-position in virtual space. FIG. 13 illustrates one of several alternative approaches for accomplishing this mapping. FIG. 13 illustrates a top down view of an exemplary virtual space, as viewed by an in-scene camera. Objects in the virtual space can be marked as near-plane objects, such as objects 1302 and 1304, or as far-plane objects, such as objects 1306, 1308 and 1316. The near- and far-plane objects are not required to be geometrically planar, but may be of any shape, including meshes of triangles or parametrically defined geometry. From the virtual camera's perspective, all visible parts of the scene can have at least one object marked near-plane and at least one object marked far-plane (objects can also be unmarked as either near-plane or far-plane).

A ray can be projected in the virtual space from the camera through the X, Y position of the cursor. Said another way, a ray can be cast from the camera through the viewport plane. Two examples of such a ray are illustrated in FIG. 13 as rays 1312 and 1314. The ray can intersect with objects in the virtual space, including near- and far-plane objects. A single near-plane and a single far-plane object can be determined by, for example, choosing the near-plane and far-plane objects that intersect with the ray and are closest to the camera. Near-plane objects can be invisible geometry, such that the player can see through them to the cursor or the far plane. For example, near-plane object 1302 and far-plane object 1306 can be determined to intersect with ray 1312 and are closest to the camera. On the other hand, near-plane object 1304 and far-plane object 1308 can be determined to intersect with ray 1314. Other techniques can be used, such as choosing the furthest near- and/or far-plane objects that intersect with the ray. Returning to ray 1312, for example, such an alternative technique would identify not near-plane object 1302 but near-plane object 1304, since near-plane object 1304 is farther away from the camera than near-plane object 1302. Once a single near-plane object and a single far-plane object have been identified, the Z-position of the cursor can be normalized according to these objects, where 0 maps to the near-point (e.g., the Z-position in virtual space of the near-plane object), 1 maps to the far-point (e.g., the Z-position in virtual space of the far-plane object), and other values are interpolated between the near-point and far-point.

For example, say a virtual scene has a wall that is 10 meters away from the camera and spans the left half of the viewport. Another wall is 20 meters away and spans the right half of the viewport. Both walls can be marked as far-plane objects. Suppose further that the player's left hand starts out extended and is all the way to the left of the hand frame and gradually moves to the right. Under the embodiments described in the previous paragraph, the cursor will typically map to the far-plane object on the left—the 10 meter wall.

Suppose the player moves his hand gradually to the right. When the ray cast from the camera crosses to the 20 meter wall, the cursor can jump back to the 20 meter wall. Even though the player's hand is at z=1.0 the whole time, the cursor should appear at different depths in the virtual space, depending on the positions of near-plane and far-plane objects.

In embodiments using automatic Z-position control, as the cursor moves around the virtual world, it can take on the Z-position that matches the object that it is in front of (relative to the point of view of the player). For example, if the cursor is in front of a "near" object, the cursor can be mapped (in the Z-direction) to the near plane. Likewise, if the object it is in front of is in the far plane, the cursor can be mapped (in the Z-direction) to the far plane.

In yet other embodiments, objects in the virtual space can additionally be marked as "wall objects." Wall objects, such as wall object 1310 in FIG. 13, can lie between near-plane and far-plane objects. Wall objects can be objects of interest that the player can engage with (e.g., touch), and/or that the cursor can "magnetize" to (e.g., causing the appearance of the secondary cursor element). In some embodiments, the cursor can navigate behind the wall objects (e.g., between the wall object and the far-plane object). In one embodiment, if a wall object is between a near-plane and far-plane object, the cursor can be magnetized to the wall object if the z-position of the cursor is within a predetermined distance of the wall object, or within a distance of the wall object that is below a threshold percentage of the distance between the near- and far-plane objects. In some embodiments, a cursor can move behind a virtual object. When this happens, the cursor can disappear when it is "behind" the object. In other embodiments, when the three-dimensional cursor moves behind an object, a "shadow" cursor can appear in front of the object to indicate (on the X-Y axis of the virtual world) the location of the cursor.

Returning again to FIG. 10, stages 1010 and 1012 relates to embodiments where it is possible to alter the viewpoint of the virtual space independently from the cursor (e.g., it is possible to pan left, right, up, or down, and, in some embodiments to zoom into the screen and out of the screen independent of the cursor's movement). One way to alter this viewpoint is to use the overall position of the player's body.

For example, at stage 1010, the overall left-right position of the player's body can be determined based on one or more joints in the skeleton. For example, the center hip position can be determined. The overall left-right position can be normalized into the range of 0 to 1 based on the visual range of camera 106. For example, if the player is all the way at the leftmost edge of the camera's field of view, the overall X-value can be 0. If the player is all the way at the rightmost edge of the camera's field of view, the value can be 1. The process 1000 can also determine the overall height of the player's body (e.g., whether the player is crouching or standing straight), as well as the overall depth of the player's body (e.g., whether the player is standing close to or far away from camera 106).

At stage 1012, the process 1000 can cause the viewpoint of the virtual camera to track the overall position of the player's body. For example, if the player's body is situated all the way to the left of the visual range of camera 106 (e.g., the overall X-value in stage 1008 is 0), the virtual camera can be configured to pan to the left. If the player's body is crouching, the virtual camera can be configured to pan down. If the player's body is standing close to camera 106, the viewpoint can be configured to zoom in. Alternatively, user gestures can be used to control the viewpoint of the camera. For example, the player can perform a zoom-in gesture with both hands. For example, if the player wants to zoom-in on a part of the virtual world that is behind the cursor, the player can stand with both hands outstretched in front of their body, and then part their arms wide to the side to zoom in (e.g., similar to the motion used in the breast-stroke style of swimming). The reverse can be true to zoom out. For example, the player can begin with each arm stretched to the side. The player can then swing their arms in to the middle of their body so that they are stretched out in front of the player's chest. In embodiments with a protagonist, the "zoom in" and "zoom out" gesture can actually move the protagonist and/or camera towards or away from the location of focus or can simply change the view while the protagonist stays still. Alternatively, if the player is moving the cursor with one hand, the player can move the cursor to something that can be zoomed in on. The player can then raise the other hand, which "primes" the zoom-in and brings in additional user interface elements. The player can then spread both hands apart, as described previously, to zoom in.

In some embodiments, if it is possible to navigate left and right in the virtual world, for example, by stepping left and right to cause the virtual camera to pan, then the overall left-right position can affect the position of the cursor by shifting the cursor's location. For example, assume that the normalized position of the player's left hand in the left hand frame is (0,0), and that this maps to a cursor position of (X,Y) in the virtual space (ignoring Z for the time being). Assume that player leaves their hand in the same position relative to their body, then steps to the left to track the camera left. Though the normalized position of the player's left hand in the left hand frame is still (0,0), the overall left-right position of the player's body decreases, so the cursor position's X position would decrease accordingly. In some embodiments, the cursor can remain at the same location on the screen, but may correspond to a different place in the virtual world. In other embodiments however, if the normalized position of the player's left hand in the left hand frame remains constant even though the overall left-right position of the player's body decreases, the cursor's x position can be configured to remain constant.

Other embodiments are within the scope and spirit of the disclosed subject matter.

For example, while portions of the foregoing description has focused on comparing velocity to a target criterion to determine if a player successfully performed a gesture, other embodiments are possible. For example, instantaneous velocity, average velocity, median velocity, displacement can also be compared to target criteria. As discussed above, "velocity" can be computed in terms of beats rather than real time (e.g., seconds), and the duration of a beat may vary throughout a song. The term "displacement" is sometimes used in this application to refer to velocities that can be relative to either kind of time.

Throughout this application, reference is made to beat information. Beat information (e.g., a beat timeline) can come from many sources, including song metadata stored in MIDI files. For example, MIDI files typically include a way to encode a fixed tempo for an entire track, but can also have a tempo track that encodes detailed tempo information throughout the duration of a song. Using this detailed tempo information, it is possible to accurately map from measure:beat:tick to minutes:seconds, even if the tempo varies during the course of a song.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions by operating on input data and generating output. Method steps can also be performed by, and apparatus can be implemented as, a game platform such as a dedicated game console, e.g., PLAYSTATION® 2, PLAYSTATION® 3, or PSP® manufactured by Sony Corporation; NINTENDO WII™, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer or game console also includes, or is operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP®, or Nintendo DS.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

This application incorporates by reference in their entirety U.S. application Ser. Nos. 12/940,794 and 13/828,035. To the extent that any portion of these two applications are inconsistent with the description herein, the description herein shall control.

What is claimed is:

1. A computerized method for use in a video game, the method comprising:

displaying, on a display, a multi-part visual cue that instructs a player to perform a target gesture at a specified time, the multi-part visual cue including:

a first part indicating the target gesture that is to be performed by the player at the specified time; and a second part providing an indication of i) the specified time, and ii) a preparation period before the specified time, wherein the distance between the first and the second parts is variable over time;

receiving, from a video camera that captures images of at least part of the player's body, position information associated with a plurality of positions of the at least part of the player's body over a time period;

determining a first displacement of the at least part of the player's body using the position information based on at least two of the plurality of positions, wherein the at least two of the plurality of positions each correspond to a different time within the time period;

determining whether the first displacement of the at least part of the player's body matches a first target displacement criterion associated with the multi-part visual cue at least in part by determining a first instantaneous error score based on an angle between the first displacement and a first direction;

when the first displacement matches the first target displacement criterion within a timing window of the specified time, altering a first gameplay characteristic of the video game;

determining a second displacement of the at least part of the player's body using the position information from the video camera;

determining whether the second displacement matches a second target displacement criterion associated with the multi-part visual cue at least in part by determining a second instantaneous error score based on an angle between the second displacement and a second direction; and when the second displacement matches the second target displacement criterion, altering a second gameplay characteristic of the video game based on a sum of the first instantaneous error score and the second instantaneous error score.

2. The computerized method of claim 1 wherein:

the first part of the multi-part visual cue indicates that the at least part of the player's body is to remain motionless; and the second part of the multi-part visual cue indicates how long the at least part of the player's body is to remain motionless.

3. The computerized method of claim 1 wherein the first target displacement criterion is one of: a magnitude of the displacement of the at least part of the player's body and a direction of the displacement of the at least part of the player's body.

4. The computerized method of claim 1 wherein the first target displacement criterion requires the at least part of the player's body to displace in one of a horizontal direction, a vertical direction, and a direction toward the video camera.

5. The computerized method of claim 1 further comprising:

displaying on the display a third part of the multi-part cue indicating an alternative gesture that can be performed by the player at the specified time;

determining whether the first displacement matches an alternative target displacement criterion associated with the alternative gesture; and when the first displacement matches the alternative target displacement criterion within the timing window of the specified time, altering a gameplay characteristic of the video game.

6. The computerized method of claim 1 further comprising:

displaying, on the display, an additional multi-part visual cue that instructs an additional player to perform an additional gesture at an additional specified time;

receiving, from the video camera, additional position information associated with positions of at least part of the additional player over time;

determining a first displacement of the at least part of the additional player using the additional position information;

determining whether the first displacement of the at least part of the additional player matches second target displacement criterion associated with the additional multi-part visual cue; and when the first displacement of the at least part of the additional player matches the second target displacement criterion within a timing window of the additional specified time, altering a gameplay characteristic of the video game.

7. The computerized method of claim 1 wherein the specified time and the additional specified time are the same.

8. The computerized method of claim 1 further comprising:

displaying, on the display, a primary cursor that is controlled by the player via the video camera;

detecting an interaction between the primary cursor and an object displayed on the display;

in response to detecting the interaction:

constraining the primary cursor to the object; and displaying a secondary cursor that is controlled by the player via the video camera system to manipulate the object.

9. A video game system comprising:

a memory storing computer executable instructions; and one or more processors coupled to the memory and configured to execute the instructions such that the one or more processors:

cause a display of a multi-part visual cue that instructs a player to perform a target gesture at a specified time, the multi-part visual cue including:

a first part indicating the target gesture that is to be performed by the player at the specified time; and a second part providing an indication of i) the specified time, and ii) a preparation period before the specified time, wherein the distance between the first and the second parts is variable over time;

receive, from a video camera that captures images of at least part of the player's body, position information associated with a plurality of positions of the at least part of the player's body over a time period;

determine a first displacement of the at least part of the player's body using the position information based on at least two of the plurality of positions, wherein the at least two of the plurality of positions each correspond to a different time within the time period;

determine whether the first displacement of the at least part of the player's body matches a first target displacement criterion associated with the multi-part visual cue at least in part by determining a first instantaneous error score based on an angle between the first displacement and a first direction;

when the first displacement matches the first target displacement criterion within a timing window of the specified time, alter a first gameplay characteristic of the video game;

determine a second displacement of the at least part of the player's body using the position information from the video camera;

determine whether the second displacement matches a second target displacement criterion associated with the multi-part visual cue at least in part by determining a second instantaneous error score based on an angle between the second displacement and a second direction; and when the second displacement matches the second target displacement criterion, alter a second gameplay characteristic of the video game based on a sum of the first instantaneous error score and the second instantaneous error score.

10. The video game system of claim 9 wherein:

the first part of the multi-part visual cue indicates that the at least part of the player's body is to remain motionless; and the second part of the multi-part visual cue indicates how long the at least part of the player's body is to remain motionless.

11. The video game system of claim 9 wherein the first target displacement criterion is one of: a magnitude of the displacement of the at least part of the player's body and a direction of the displacement of the at least part of the player's body.

12. The video game system of claim 9 wherein the first target displacement criterion requires the at least part of the player's body to displace in one of a horizontal direction, a vertical direction, and a direction toward the video camera.

13. The video game system of claim 9 wherein the computer executable instructions are further configured to cause the one or more processors to:

cause the display of a third part of the multi-part cue indicating an alternative gesture that can be performed by the player at the specified time; and determine whether the first displacement matches an alternative target displacement criterion associated with the alternative gesture; and when the first displacement matches the alternative target displacement criterion within the timing window of the specified time, alter a gameplay characteristic of the video game.

14. A non-transitory computer readable medium comprising instructions that, when executed by one or more processors, cause the one or more processors to:

display, on a display, a multi-part visual cue that instructs a player to perform a target gesture at a specified time, the multi-part visual cue including:

a first part indicating the target gesture that is to be performed by the player at the specified time; and a second part providing an indication of i) the specified time, and ii) a preparation period before the specified time, wherein the distance between the first and the second parts is variable over time;

receive, from a video camera that captures images of at least part of the player's body, position information associated with a plurality of positions of the at least part of the player's body over a time period;

determine a first displacement of the at least part of the player's body using the position information based on at least two of the plurality of positions, wherein the at least two of the plurality of positions each correspond to a different time within the time period;

determine whether the first displacement of the at least part of the player's body matches a first target displacement criterion associated with the multi-part visual cue at least in part by determining a first instantaneous error score based on an angle between the first displacement and a first direction;

when the first displacement matches the first target displacement criterion within a timing window of the specified time, alter a first gameplay characteristic of the video game;

determine a second displacement of the at least part of the player's body using the position information from the video camera;

determine whether the second displacement matches a second target displacement criterion associated with the multi-part visual cue at least in part by determining a second instantaneous error score based on an angle between the second displacement and a second direction; and when the second displacement matches the second target displacement criterion, alter a second gameplay characteristic of the video game based on a sum of the first instantaneous error score and the second instantaneous error score.

15. The non-transitory computer readable medium of claim 14 wherein:

the first part of the multi-part visual cue indicates that the at least part of the player's body is to remain motionless; and the second part of the multi-part visual cue indicates how long the at least part of the player's body is to remain motionless.

16. The non-transitory computer readable medium of claim 14 wherein the first target displacement criterion is one of: a magnitude of the displacement of the at least part of the player's body and a direction of the displacement of the at least part of the player's body.

17. The non-transitory computer readable medium of claim 14 wherein the first target displacement criterion requires the at least part of the player's body to displace in one of a horizontal direction, a vertical direction, and a direction toward the video camera.

18. The non-transitory computer readable medium of claim 14 wherein the instructions are further configured to cause the one or more processors to:

display on the display a third part of the multi-part cue indicating an alternative gesture that can be performed by the player at the specified time;

determine whether the first displacement matches an alternative target displacement criterion associated with the alternative gesture; and when the first displacement matches the alternative target displacement criterion within the timing window of the specified time, alter a gameplay characteristic of the video game.

* * * * *